United States Patent
Di Gregorio

(10) Patent No.: US 7,406,046 B2
(45) Date of Patent: Jul. 29, 2008

(54) SCHEDULER FOR SIGNALING A TIME OUT

(75) Inventor: Lorenzo Di Gregorio, Eching (DE)

(73) Assignee: Infineon Technologies AG, Munich (DE)

( * ) Notice: Subject to any disclaimer, the term of this patent is extended or adjusted under 35 U.S.C. 154(b) by 790 days.

(21) Appl. No.: 10/825,755

(22) Filed: Apr. 15, 2004

(65) Prior Publication Data

US 2004/0208173 A1 Oct. 21, 2004

(30) Foreign Application Priority Data

Apr. 15, 2003 (DE) ................................. 103 17 370

(51) Int. Cl.
*G01R 31/08* (2006.01)
*G06F 11/00* (2006.01)

(52) U.S. Cl. .................................... 370/232; 370/235.1

(58) Field of Classification Search ................. 370/360, 370/278, 472, 230.1, 235.1, 395.1, 395.43, 370/395.21, 395.4, 485, 486; 347/188; 709/249; 711/133; 710/310; 375/372; 365/221

See application file for complete search history.

(56) References Cited

U.S. PATENT DOCUMENTS

| | | | |
|---|---|---|---|
| 5,500,943 A * | 3/1996 | Ho et al. ..................... | 712/218 |
| 5,691,984 A | 11/1997 | Gardner et al. | |
| 6,463,486 B1 | 10/2002 | Parry et al. | |
| 6,700,825 B1 * | 3/2004 | Ebergen ..................... | 365/221 |
| 6,757,348 B1 * | 6/2004 | Vila et al. .................... | 375/372 |
| 6,772,269 B1 * | 8/2004 | Kaganoi ..................... | 710/310 |
| 2003/0084250 A1 * | 5/2003 | Gaither et al. .............. | 711/133 |
| 2005/0063396 A1 * | 3/2005 | Yu .............................. | 370/401 |

FOREIGN PATENT DOCUMENTS

EP 0634867 B1 8/1999

* cited by examiner

*Primary Examiner*—Chirag G Shah
*Assistant Examiner*—Nima Mahmoudzadeh
(74) *Attorney, Agent, or Firm*—Laurence A. Greenberg; Werner H. Stemer; Ralph E. Locher

(57) ABSTRACT

A buffer storage memory data scheduler includes a write unit writing data objects to the memory, which unit receives data packets from a data source at a variable transmission rate, calculates attribute data for each received packet, and writes the packet data to the memory as a data object string including linked data objects. The string includes pointer data for linking the objects, calculated attribute data, and packet payload data. The write unit inserts filling objects into the memory between linked data objects to compensate for the variable rate when writing the string to the memory. The write unit increments a counter when the string is written. A time out signaling unit signals to a data processing unit that a buffer-stored data/filling object is ready to be read when the counter reaches a value. The signaling unit decrements the counter corresponding to the data in the object.

34 Claims, 13 Drawing Sheets

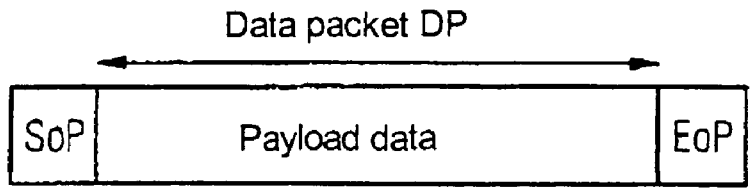
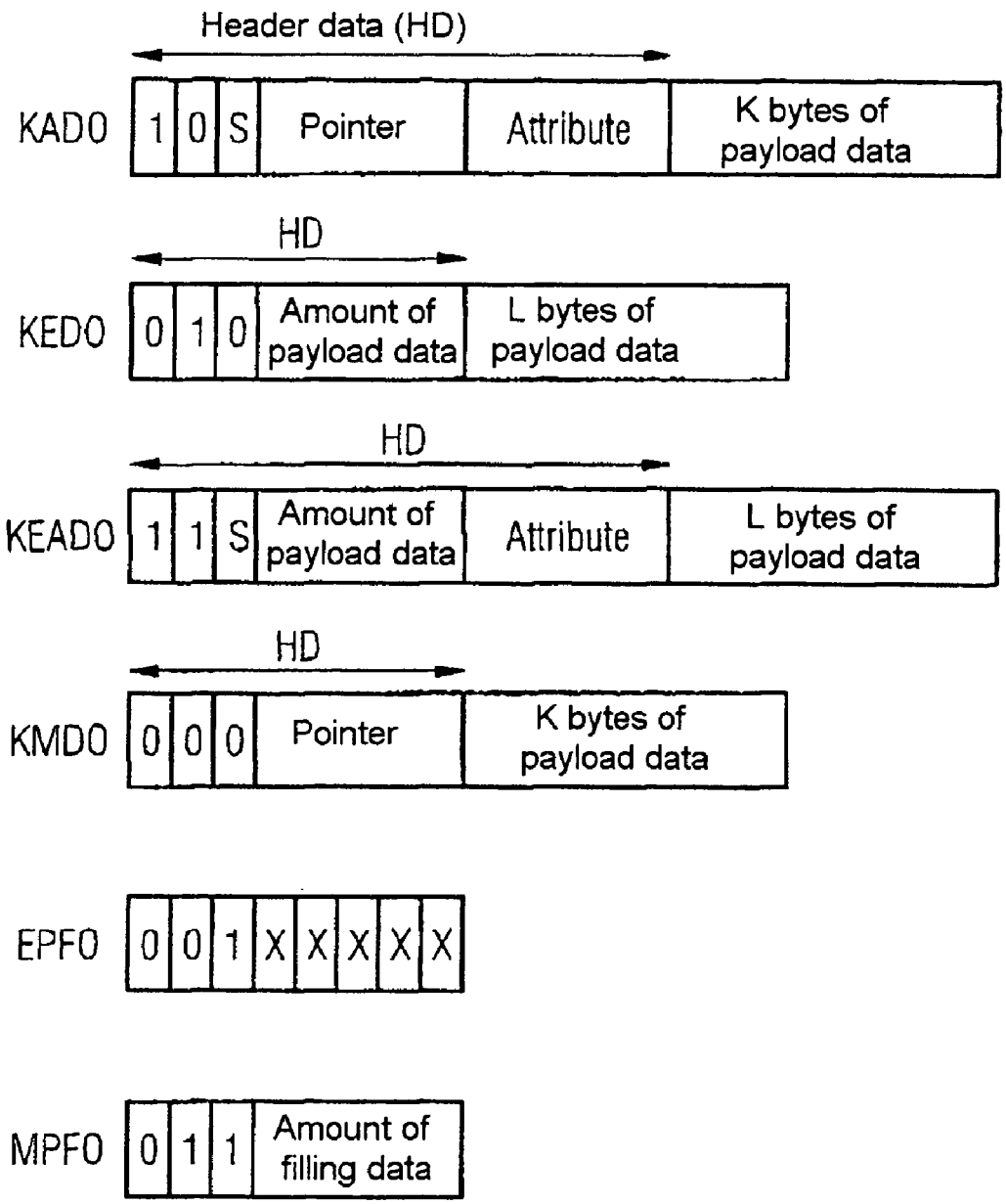

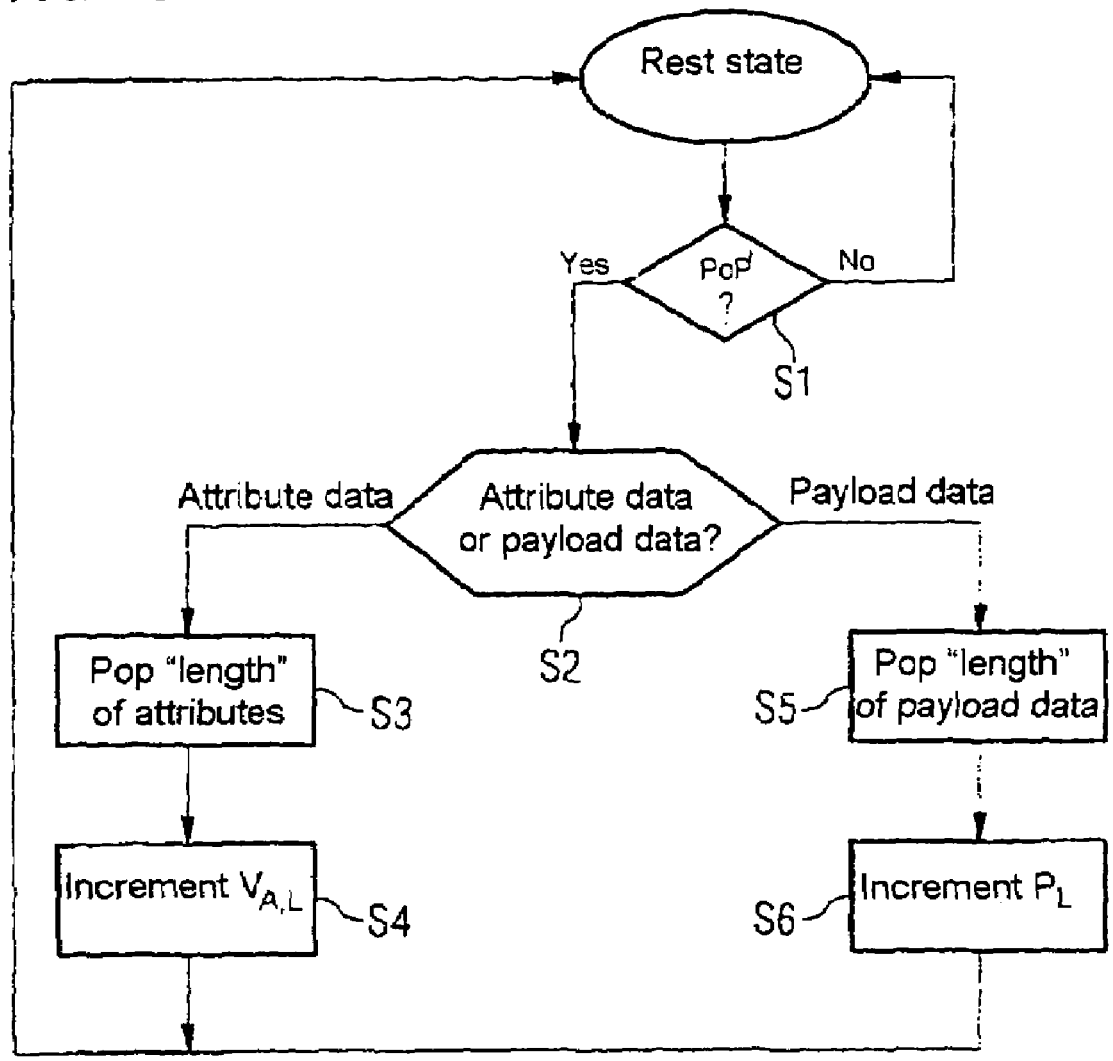

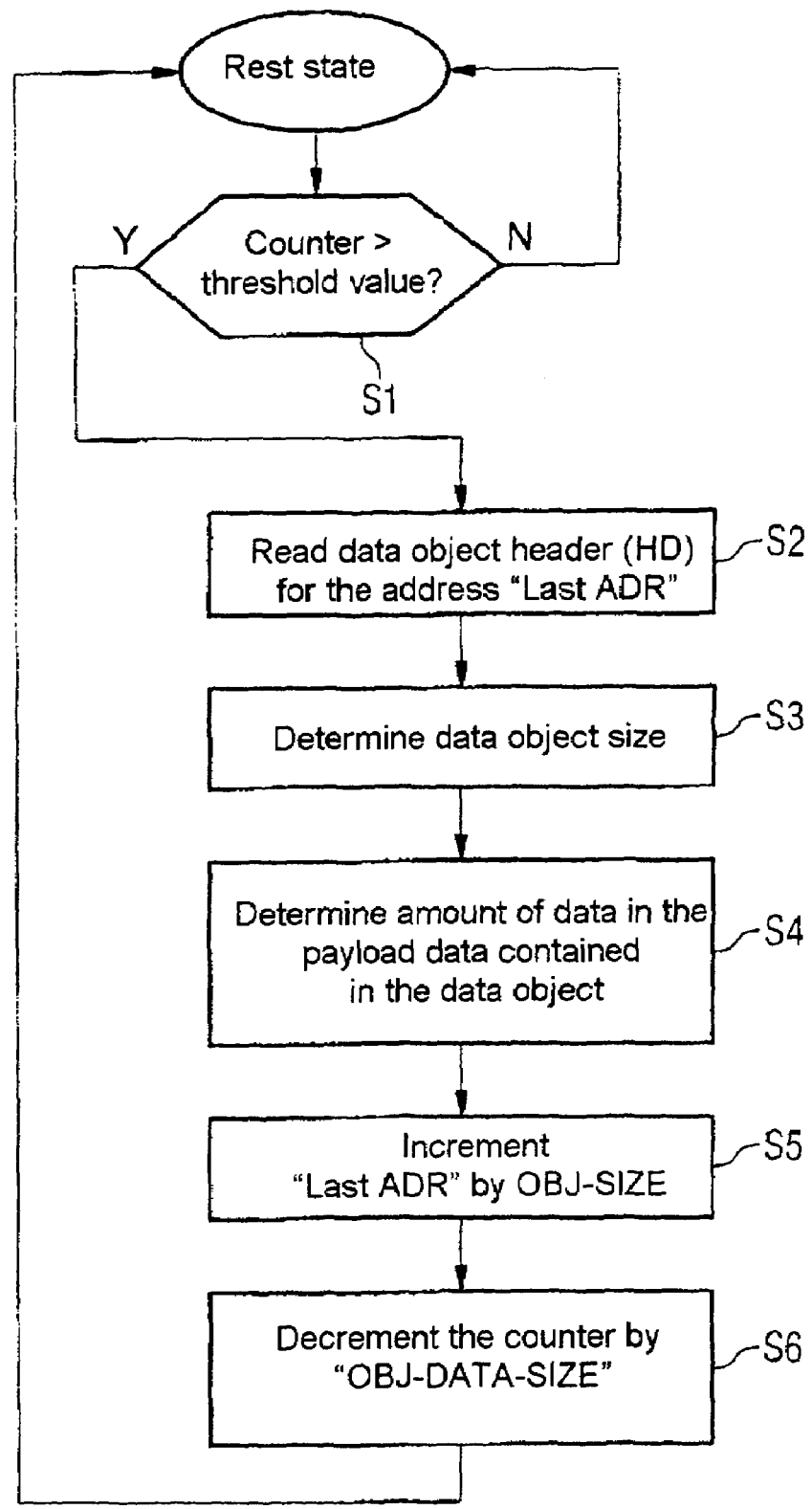

SCHEDULER FOR SIGNALING A TIME OUT

BACKGROUND OF THE INVENTION

Field of the Invention

The invention relates to a scheduler for a memory system, which signals to a data processing unit that data to be stored in the memory system is stored for a time period that is defined by the user.

FIG. 1 shows the fundamental configuration for data processing. Data is emitted in parallel or serial form from a data source to a data processing unit, which processes the data in accordance with a calculation rule, and emits the processed data to a downstream data sink.

The data stream arrives in accordance with a data arrival curve at the data input of the data processing unit. FIG. 2 shows a linear or ideal data arrival curve. In the case of actual data transmission, the data arrival curve is not linear, but has different gradients and discontinuities that, for example, originate from data bursts.

The data processing unit processes the data in accordance with a data-operating curve, which is illustrated in FIG. 2. If, as in the case of the example illustrated in FIG. 2, more data arrives at the input E of the data processing unit than can be processed by the data processing unit, a buffer store must be provided at the input E of the data processing unit to buffer-store the excess data. The minimum memory size of the buffer store corresponds to the maximum difference between the arrival curve and the operating curve. The data that is processed in the data processing unit must be made available to the downstream data sink within a predetermined delay time $\Delta T$. The data stream that arrives in the data processing unit must be signaled, after a predetermined delay time $\Delta T$, to the downstream data sink as data to be retrieved. The data remains available in the time period between the arrival time of the data and the emission time, when the time delay reaches the desired time delay value $\Delta T$. Once this time interval or time period has elapsed, the data that has not been passed on to the data sink and/or processed is either sent immediately with priority, is moved to a different storage location, or is deleted. The data source produces the data stream (traffic) with an arrival curve, which is virtually linear in places, at the output of the data source. The data stream is modified by the data transmission channel. The data processing unit emits the received data after the predetermined time delay "$\Delta T$". In such a case, it is desirable for the linear arrival curve of the data source to be reconstructed with a predetermined time delay at the output A of the data processing unit. The data stream data that is emitted from the data processing unit may be routed to different data sinks. In a practical application, it is necessary to implement a time out for the arriving data within a memory administration system to avoid jamming or deadlock situations. Once the time out "$\Delta T$" has elapsed, the buffer-stored data must either be deleted or moved to another memory to release the memory space in the buffer store. To comply with quality of service requirements, it is, in such a case, important to maintain a deterministic, predetermined, accurate time delay "$\Delta T$".

In the case of a so-called time stamping according to the prior art, each arriving data packet DP in the data stream that arrives at the input E of the data processing unit is provided with a time stamp, which indicates the arrival time at the input E. The arriving data packet DP is read, and the time of arrival of the data packet is measured. The measured data arrival time is stored as a time stamp in a table. A periodic check is, then, carried out to determine whether or not the received data packet has already been in the data processing unit for longer than the predetermined delay time $\Delta T$. Those data packets whose time out has been reached are, then, deleted or stored elsewhere.

One serious disadvantage in the case of time stamping is that a data stream that includes a large number of data packets must be administered by the data processing unit with a corresponding number of time stamps. On one hand, an associated memory space must be provided for each time stamp and, furthermore, a very large number of time comparison processes are required. Thus, the circuitry complexity within the data processing unit increases considerably if the comparisons of the various time stamps are intended to be carried out at the same time. If the time comparisons are carried out sequentially due to the large number of time stamps, the inaccuracy with respect to the delay time $\Delta T$ increases.

A so-called time wheel memory administration method has, therefore, been proposed according to the prior art. FIG. 3 shows a configuration to explain the time wheel method. A data processing unit receives from a scheduler the information to retrieve the data to be processed from the memory system. The scheduler is connected to two data sources A, B through a network. In the example illustrated in FIG. 3, each data source sequentially emits five data packets to the network. The data packets or data cells are, for example, ATM data cells with a predetermined data size of 53 bytes. The five ATM data cells are fragmented in order to fragment a relatively large data packet. In such a case, the large data packet is received and is fragmented into smaller cells, and the fragmented cells are, then, transmitted through the network to a data processing unit. The data processing unit joins the received data cells together to recreate the original data packet.

The ATM cells that are transmitted through the network arrive in an undefined sequence at the scheduler, which writes them to the memory system. If the memory system has a relatively large size $SP_0$, the data cells A to E from the first data source A and the data cells $\alpha$ to $\epsilon$ from the second data source B are, by way of example and as illustrated in FIG. 3, written to the memory system using a FIFO method.

A problem occurs if the memory size of the memory system is relatively small, for example, $SP_1$. In such a case, it is impossible to write a complete string (for example, including five ATM cells) to the memory system. Once the ATM cell 6 from the second data source B has been written to it, the memory system is full, and the scheduler has to decide, when the next ATM cells $\epsilon$, D, E arrive, that already stored ATM cells must be deleted within the memory system to allow a complete ATM cell string (which can subsequently be processed appropriately through the data processing unit) to be buffer-stored in the memory system. The scheduler can, thus, delete or change the memory locations of data packets in accordance with a strategy or a policy or if the memory system is full and further data packets arrive. For example, the scheduler could delete the first data packet A that arrived to create memory space for the next arriving data packet $\epsilon$. In such a case, the complete string of ATM cells from the data source B would be buffer-stored in the memory system, and would be available for data processing by the data processing unit. An alternative strategy is the complete deletion of all received data cells from a data source, for example, the data cells $\alpha$, $\beta$, $\gamma$, $\delta$ from the data source B, to create memory space for the two arriving data cells D, E so that the data processing unit can process the data in the data source A, that is to say, the ATM cells A to E.

In the case of the time wheel method, which is illustrated in FIG. 3, the arriving ATM cells are stored in the sequence in which they arrive. The memory system is a FIFO memory. In the case of the time wheel method, the memory occupancy of the memory system is used as a measure of the time. For such a purpose, the data is stored in a conventional manner in a circular FIFO data buffer. If an arriving data cell is buffer-stored at a location X, the next data or data packets is or are stored at memory locations that follow the memory location X. As such, the FIFO memory is filled successively until the filed memory space reaches a specific level, or the memory is completely filled with data. If the amount of arriving data is recorded and the data arrives at a predetermined data rate R, it is possible to calculate the time that has passed since the data packet DP at the position X is buffer-stored. Because the memory full level corresponds to the time out of the buffer-stored data cell, or of the buffer-stored data packet, the scheduler can signal to the data processing unit that the previously stored data packet has timed out, as soon as the memory full level is reached.

One disadvantage of the time wheel method is that the arriving data stream is only rarely at a constant, uniform data rate R. In many applications, there are time gaps between the arrival of the various data cells or data packets. Because the data rate is assumed to be constant for calculation purposes, due to the fact that data transmission rates fluctuate widely in some cases, this results in the calculation of the time out being very inaccurate.

An improved time wheel method (enhanced time wheel) has, thus, been proposed, in which time gaps between the arrival of data packets are bridged by so-called dummy cells or filling data cells. If no data packet or no data cell arrives at the scheduler within a variable waiting time, the scheduler writes a filling data cell to the FIFO memory in the memory system.

FIG. 4 shows, schematically, a FIFO memory in which a sequence of ATM cells Z1, Z2, Z3, Z4 have been written in accordance with the sequence of their arrival. The ATM cells are linked to one another by pointers and have a fixed data size of 53 bytes. The data processing unit uses the linking process to identify that the ATM cells have originated from the same data source. If the time difference between the arrival of an ATM cell $Z_1$ and a second ATM cell $Z_{i+1}$ exceeds a specific waiting time, the scheduler writes a filling cell to the FIFO memory. As soon as the FIFO memory is full, those ATM cells that arrived first and, thus, represent the oldest ATM cells are deleted or are written to another memory. The provision of dummy or filling cells increases the accuracy in the calculation of the time out because the filling cells reflect the time during that no ATM data cells were received by the scheduler.

One disadvantage of the procedure illustrated in FIG. 4 is the so-called internal fragmentation. The data cells have a fixed data size. If, by way of example, the data cells are ATM data packets or ATM data cells, the data cells include 53 bytes. The filling data cells are of the same size as the data cells, that is to say, the filling data cells, likewise, include 53 bytes. In the case of the enhanced time wheel method, as is illustrated in FIG. 4, if, for example, an IP data packet with a size of 54 bytes is received and this is converted in a protocol conversion process to a sequence of ATM data cells, this results in a first data cell with 53 bytes and a second ATM data cell that contains only 1 byte of payload data. The other 52 bytes from the second ATM data source, which do not contain any payload data, likewise, lead to occupancy of memory space within the FIFO memory and, thus, to memory wastage.

The smaller the size of the data cells or data fragments is chosen to be, the greater is the proportion of the overhead or header data in the cells in comparison to the stored payload data. Furthermore, there is an increase in the data length of the pointers that are contained in the data cells and ensure that the cells are linked to one another. The larger the memory cells that are used, the more memory space is wasted, however, due to the fragmentation process and the greater is the inaccuracy of the calculated time out. If the cell size is reduced, much less memory space is wasted for the fragmented payload data, but more memory space is wasted for the overhead or header data in the data cells.

SUMMARY OF THE INVENTION

It is accordingly an object of the invention to provide a scheduler for signaling a time out that overcomes the hereinafore-mentioned disadvantages of the heretofore-known devices of this general type and that, on one hand, uses the memory capacity of the memory system as efficiently as possible and, on the other hand, signals the available data packets with very good time accuracy.

With the foregoing and other objects in view, there is provided, in accordance with the invention, a scheduler for a memory system for buffer storage of data processed by at least one data processing unit, including a write unit for writing data objects to the memory system, the write unit receiving data packets from at least one data source at a variable data transmission rate, the data packets having payload data, calculating attribute data for each received data packet, writing the data contained in the data packet to the memory system as a data object string including data objects linked to one another, the data object string including pointer data for linking the data objects, the attribute data calculated, and the payload data, and inserting filling objects into the memory system between the data objects linked to one another to compensate for the variable data transmission rate when writing the data object string to the memory system, a counter connected to the write unit and incremented by the write unit when the data object string is written to the memory system to correspond to an amount of data contained in the data packet and the filling data in the filling objects, and a time out signaling unit connected to the counter, the time out signaling unit signaling, when the counter reaches a threshold value, to the data processing unit that at least one of the data object and the filling object buffer-stored in the memory system is ready to be read and subsequently decrementing the counter corresponding to the data contained in the data object provided.

According to the invention, a scheduler and a time out signaling circuit for a memory system for buffer storage of data processed by at least one data processing unit has a write unit, a counter, and a time out signaling unit. The write unit for writing data objects to the memory system receives data packets from at least one data source at a variable data transmission rate, calculates attribute data for each received data packet, and writes the data contained in the data packet to the memory system as a data object string including data objects linked to one another. The data object string includes pointer data for linking the data objects, the calculated attribute data, and the payload data contained in the data packet. The write unit additionally inserts filling objects into the memory system between the linked data objects to compensate for the variable data transmission rate when writing the data object string to the memory system. The counter is incremented by the write unit when the data object string is written to the memory system, corresponding to the amount of data contained in the data packet and the filling data in the filling objects. The time out signaling unit signals to the data processing unit that a data object or filling object that has been buffer-stored in the memory system is ready to be read when the counter reaches a threshold value. Then, the time out signaling unit decrements the counter corresponding to the data contained in the object provided.

One advantage of the scheduler according to the invention is that it can process any desired generic data packets DP. The arriving data packets DP need not be in a specific data format and may have variable data packet sizes. The scheduler according to the invention can, thus, also be used in a preferred manner for Ethernet data packets or IP data packets.

The scheduler according to the invention uses the counter to count the amount of data in the payload data contained in the arriving data packets, and adds the amount of filling data thereto. The counter does not, in such a case, count the amount of data in the overhead data or attribute data that is calculated for the data object string.

The arriving data packets DP are written to the memory system as a data object string. Each data object string includes at least one data object. The data objects in the data object string are linked to one another by the pointer data. A data object string, which includes two or more data objects, includes data objects of a different data object type. A typical data object string includes a string start data object (KADO), a large number of linked string center data objects (KMDO), and a string end data object (KEDO). If the arriving data string is so short that only one data object is required, the data object string is formed by one data object, which is referred to as the string end and start data object (KEADO). The various data object types have different data formats and different data sizes.

To compensate for variable data transmission rates when the scheduler is writing the data object string to the memory system, filling data objects are additionally written between the linked data objects by the scheduler. Two different filling data objects, specifically, a single-byte filling data object EBDFDO and a multiple byte filling data object MBFDO, are substantially provided for such a purpose.

The linking of data objects with a variable data size makes optimum use of the memory space within the memory system. The provision of filling data objects of a variable size furthermore optimizes the accuracy of the time out calculation because the filling data objects accurately reflect those time intervals in which the scheduler has not received any data from the data sources. The filling data objects are, thus, used to compensate for the variable data transmission rate when the data object string is being written to the memory system.

In accordance with another feature of the invention, a first data object type is a string start data object (KADO), which has a type data field for identification as the string start data object, a transmission flag, a pointer data field for linking, an attribute data field, and a payload data field.

In accordance with a further feature of the invention, the scheduler has a string end data object (KEDO) as the second data object type, which has a type data field for identification as the string end data object, a data field for inputting the amount of payload data, and a payload data field.

In accordance with an added feature of the invention, the scheduler has a string end and start data object (KEADO) as the third data object type, which has a type data field for identification as the string end and start data object, its data field for outputting the amount of payload data, a transmission flag, an attribute data field, and a payload data field.

In accordance with an additional feature of the invention, this scheduler has a string center data object (KMDO) as the fourth data object type, which has a type data field for identification as the string center data object, a pointer data field, and a payload data field.

In accordance with yet another feature of the invention, the scheduler has a single-byte filling data object (EBFDO) as the fifth data object type, which has a type data field including one byte for identification as a single-byte filling data object.

In accordance with yet a further feature of the invention, the scheduler has a multiple byte filling data object (MBFDO) as the sixth data object type, which has a type data field for identification as a multiple byte filling object and a data field that indicates the amount of filling data.

In accordance with yet an added feature of the invention, the write unit, preferably, has a control path and a data path.

The data path of the write unit, preferably, has a FIFO control unit for writing and reading data to and from a FIFO memory that is connected to it.

The FIFO control unit, preferably, receives data from at least one data source in the form of packets as data packets.

In such a case, each received data packet, preferably, has a control data item (SoP), which identifies the start of the data packet, and a control data item (EoP) that identifies the end of the data packet, and data packet payload data located in between.

The data packet payload data in the received data packets, preferably, in each case includes administration data (header) and information data (payload).

The control path, preferably, calculates attribute data for each received data packet.

In such a case, the control path, preferably, calculates the attribute data as a function of system settings and/or the administration data (header) in the data packets.

The control path, preferably, stores the calculated attribute data in an attribute data buffer of the FIFO memory.

The FIFO control unit, preferably, stores the payload data in a data packet in a payload data buffer for the FIFO memory.

In accordance with yet an additional feature of the invention, the FIFO memory has an associated attribute data buffer and an associated payload data buffer for each data source.

The FIFO control unit, preferably, produces an error signal (ERROR) when a payload data buffer associated with one data source is full and receives no further data.

In accordance with again another feature of the invention, the FIFO control unit in the data path, as a function of control signals that the FIFO control unit receives from the control path of the write unit, writes the attribute data (which have been buffer-stored in the attribute data buffer) and the payload data (which have been buffer-stored in the payload data buffer) in a data packet to the memory system in the form of a data object string including data objects that are linked to one another.

The FIFO control unit, preferably, calculates the cumulative amount of attribute data (VA, L) of the attribute data (which have been written to the memory system) in a data packet.

The FIFO control unit, preferably, calculates a cumulative amount of payload data (PL) of the payload data (which is being written to the memory system) in a data packet.

In accordance with again a further feature of the invention, the data path of the write unit has a counting device (Timed Address Generator), which is incremented linearly in accordance with a linear nominal data arrival curve ($\alpha(t)$).

In accordance with again an added feature of the invention, the data path of the write unit has an effective data address generator that calculates a time wheel distribution ($W^+_\alpha(t)$) as a function of the calculated cumulative amount of data (PL) and of the count produced by the counting device, as follows:

$$W_\alpha^{*'}(t) = \begin{cases} R'(t) & \text{if } W_\alpha^*(t) > \alpha(t) \\ \max[R'(t)\alpha'(t)] & \text{if } W_\alpha^*(t) = \alpha(t) \\ \alpha'(t) & \text{if } W_\alpha^*(t) < \alpha(t) \end{cases}$$

$W^*_\alpha(0)=0$, where, at all times, $\bar{t}$ is such that:

$$\lim_{t \to \bar{t}^+} X(t) = \lim_{t \to \bar{t}^-} X(t) + h, h > 0$$

with the definition of the operator "max" being expanded as follows:

$$X'(\bar{t}) = h\delta_{\bar{t}} + X'^+(\bar{t}), \ X'^+(\bar{t}) = \lim_{\Delta \to 0'} \frac{X(\bar{t}+\Delta) - X(\bar{t})}{\Delta}$$

$$\max[a\delta_{\bar{t}} + A(t), B(t)] = \begin{cases} \max[A(t), B(t)] & t \neq \bar{t} \\ a\delta_{\bar{t}} + A(\bar{t}) & t = \bar{t} \end{cases}$$

$$\max[a\delta_{\bar{t}} + A(t), b(\delta_{\bar{t}}) + B(t)] = \begin{cases} \max[A(t), B(t)] & t \neq \bar{t} \\ \max(a, b)\delta_{\bar{t}} + \max[A(\bar{t}), B(\bar{t})] & t = \bar{t} \end{cases}$$

The function $W^*_\alpha(t)$ is the cumulative distribution of the emitted data stream for an ideal case, in which an arriving data stream with a cumulative data distribution $R(t)$ is received with a predetermined arrival curve at $\alpha(t)$, where $R(t)$ is the amount of data in the received data packet, and $\alpha$ is the linear nominal data arrival curve.

In accordance with again an additional feature of the invention, the data path of the write unit has a modulo-M adder, which adds the cumulative amount of attribute data ($V_{A,L}$) to the calculated time switch distribution ($W^*_\alpha(t)$) to produce a data object address modulo-M, where M is the memory capacity of the memory system.

In accordance with still another feature of the invention, the data path of the write control unit has a basic address register bank that includes two or more basic address registers, and with one basic address register being provided for each data source.

In accordance with still a further feature of the invention, the initial address of the data object is written to the basic address register whenever there is a change to the calculated cumulative amount of payload data ($P_L$).

In accordance with still an added feature of the invention, the data path of the write unit has a link address register bank that includes two or more link address registers, one link address register being provided for each data source.

In accordance with still an additional feature of the invention, the link address register is used to buffer-store the address of the data object that was written most recently to the memory system for linking to the next data object in the data object string.

In accordance with another feature of the invention, the data path of the write unit has a data multiplexer for writing data to the memory system and an address multiplexer for application of an address to the memory system.

The data multiplexer, preferably, has a first input, which is connected to the FIFO memory to receive the attribute and payload data read from the FIFO memory, and, preferably, has a second input that is connected to the base address register bank to receive the linking data.

The address multiplexer, preferably, has a first input that is connected to the output of the modulo-M adder to receive a data address, and, preferably, has a second input that is connected to the link address register bank to receive a string address.

In accordance with a further feature of the invention, the data path of the write unit can be switched between two operating modes as a function of a control signal that is generated by the control path:

with the first input of the data multiplexer and of the address multiplexer each being connected to the memory system in the first operating mode to write data objects to the memory system; and with the second input of the data multiplexer and of the address multiplexer each being connected to the memory system in the second operating mode to link the most recently written data object.

With the objects of the invention in view, in a data processing device having at least one data source, a memory system, and at least one data processing unit, there is also provided a scheduler for buffer storing data processed by the data processing unit including a write unit writing data objects to the memory system, the write unit receiving data packets from the at least one data source at a variable data transmission rate, the data packets having payload data, calculating attribute data for each received data packet, writing the data contained in the data packet to the memory system as a data object string including data objects linked to one another, the data object string including pointer data for linking the data objects, the attribute data calculated, and the payload data, and inserting filling objects into the memory system between the data objects linked to one another to compensate for the variable data transmission rate when writing the data object string to the memory system, a counter connected to the write unit and incremented by the write unit when the data object string is written to the memory system to correspond to an amount of data contained in the data packet and the filling data in the filling objects, and a time out signaling unit connected to the counter, the time out signaling unit signaling, when the counter reaches a threshold value, to the data processing unit that at least one of the data object and the filling object buffer-stored in the memory system is ready to be read and subsequently decrementing the counter corresponding to the data contained in the data object provided.

With the objects of the invention in view, in a data processing device having at least one data source, a memory system, and at least one data processing unit, there is also provided a scheduler for buffer storing data processed by the data processing unit, the scheduler including a counter, a write unit for writing data objects to the memory system, the write unit connected to the counter and being programmed to receive data packets from the at least one data source at a variable data transmission rate, the data packets having payload data, calculate attribute data for each received data packet, write the data contained in the data packet to the memory system as a data object string including data objects linked to one another, the data object string including pointer data for linking the data objects, the attribute data calculated, and the payload data, compensate for the variable data transmission rate when writing the data object string to the memory system by inserting filling objects into the memory system between the data objects linked to one another, and increment the counter to correspond to an amount of data contained in the data packet and the filling data in the filling objects when the data object string is written to the memory system, a time out signaling unit connected to the counter, the time out signaling unit being programmed to signal, when the counter reaches a threshold value, to the data processing unit that at least one of the data object and the filling object buffer-stored in the memory system is ready to be read and subsequently decrement the counter corresponding to the data contained in the data object provided.

Other features that are considered as characteristic for the invention are set forth in the appended claims.

Although the invention is illustrated and described herein as embodied in a scheduler for signaling a time out, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 9 is a diagrammatic illustration of a data packet to be processed by the scheduler according to the invention;

FIG. 10 is a set of diagrammatic illustrations of data formats of data objects generated by the scheduler according to the invention and stored as a data object string in the memory system;

FIG. 15 is a flowchart of the FIFO control unit according to the invention for determination of the cumulative amount of payload data (PL) and of the cumulative amount of attribute data;

FIG. 16 is a flowchart of a program run in the time out signaling unit according to the invention to decrement the counter.

DESCRIPTION OF THE PREFERRED EMBODIMENTS

Figure 1:
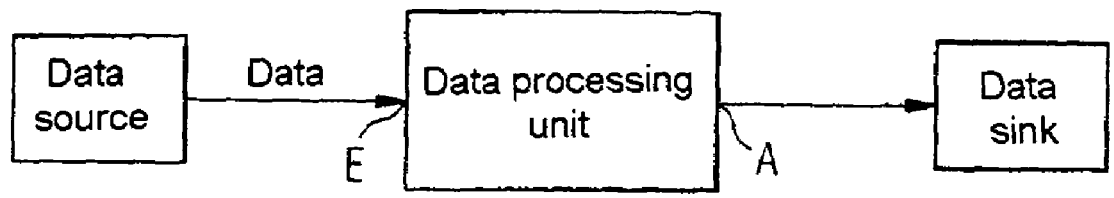
FIG. 1 is a block diagram of a conventional data processing configuration.
Figure 2:
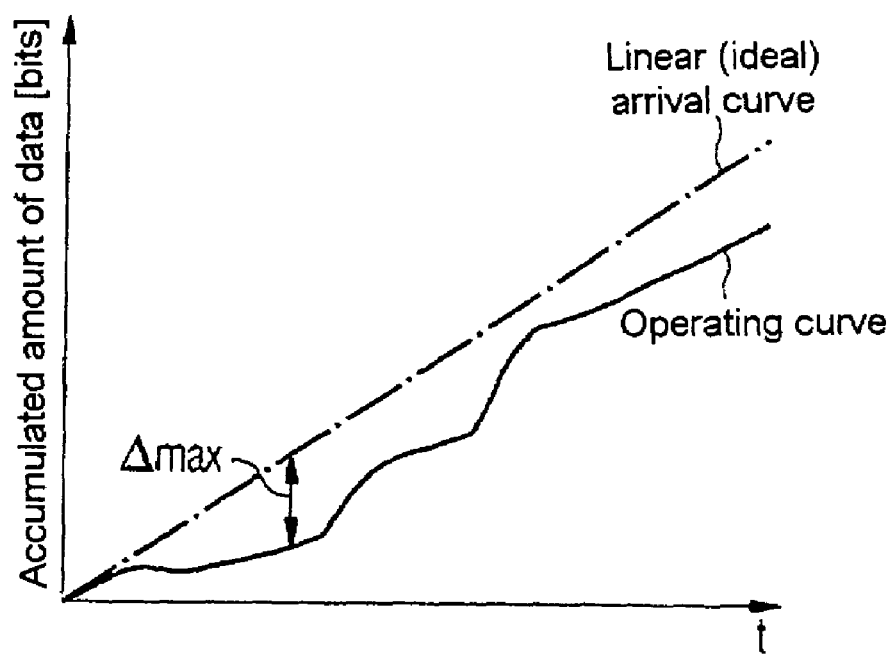
FIG. 2 is a graph illustrating a method of operation of a conventional scheduler.
Figure 3:
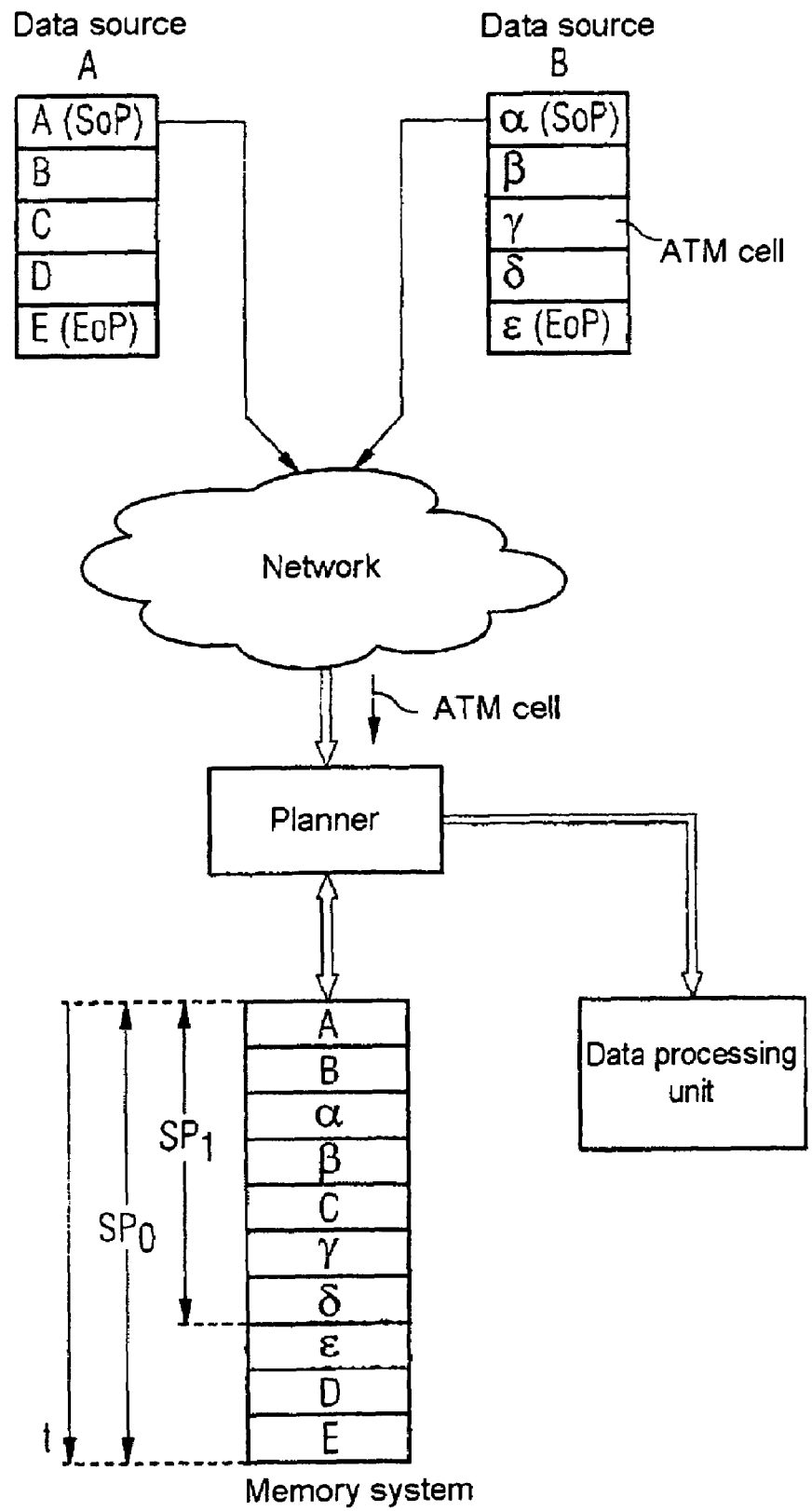
FIG. 3 is a block diagram of an example configuration explaining a prior art time wheel scheduling method.
Figure 4:
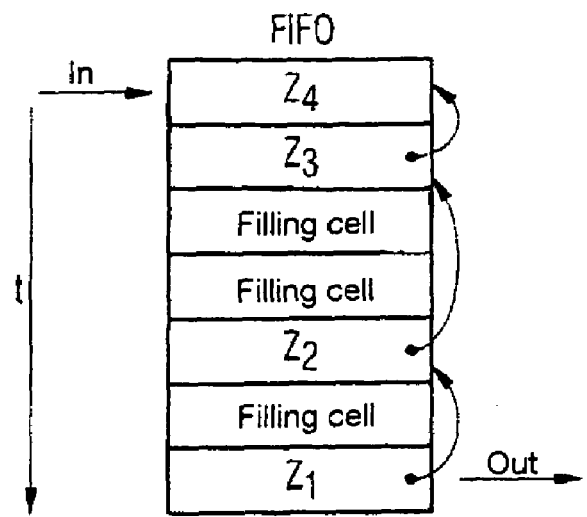
FIG. 4 is a block diagram of a FIFO memory explaining a conventional enhanced time wheel method.
Figure 5:
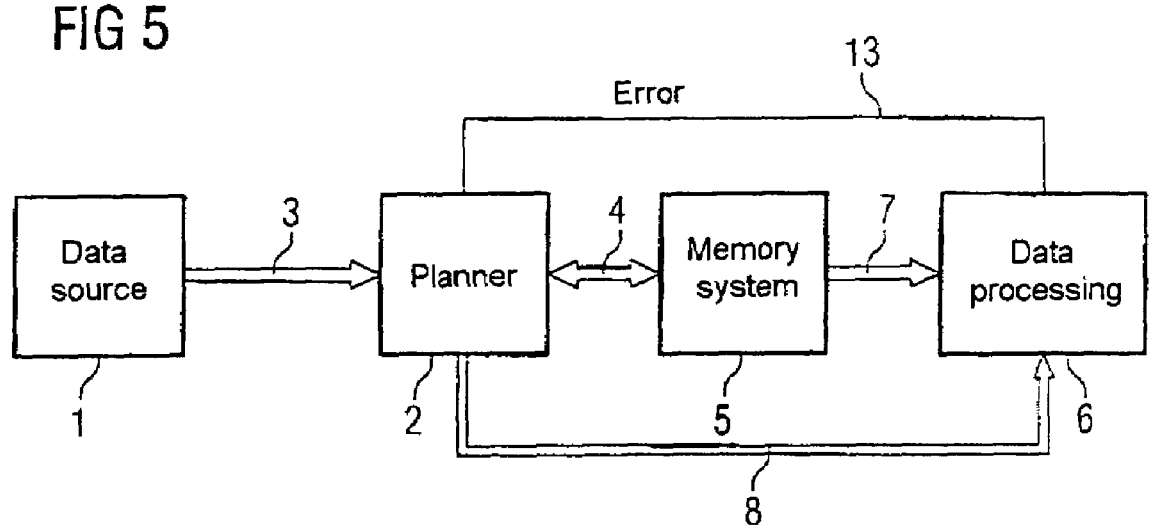
FIG. 5 is a block circuit diagram of a data processing configuration with a scheduler according to the invention.

Referring now to the figures of the drawings in detail and first, particularly to FIG. 5 thereof, there is shown a data processing circuit configuration that contains a scheduler 2 according to the invention. The scheduler 2 receives data in packets through a serial or parallel data bus 3 from at least one data source 1. The scheduler 2 is connected to a memory system 5 through lines 4. A data processing unit 6 reads the data to be processed from the memory system 5 through a data bus 7. The scheduler 2 uses lines 8 to signal to the data processing unit 6 that data is available within the memory system 5 for processing. FIG. 5 shows an outline configuration. The scheduler 2 may, in alternative configurations, be connected on one side to a large number of data sources or data channels. If two or more data channels are connected, the data is supplied with any desired granularity using a time domain multiplexing method TDM. Furthermore, the memory system 5 may be connected to a large number of data processing units 6, which use the memory system 5 as a shared memory. The memory system 5 may be any desired memory system or a memory hierarchy with access arbitration. The scheduler 2 according to the invention uses the line 8 to indicate to the data processing unit 6 that data objects for further processing by the data processing unit are waiting after a time out $\Delta T$. The scheduler 2 receives an undefined data packet DP from the data source. The data packet may be a generic data packet DP, that is to say, the scheduler 2 according to the invention is able to process data packets DP in any desired data format. The data packet DP, which originates from the data source 1, has a control data item SoP, which identifies the start of the data packet DP, and a control data item (EoP) that identifies the end of the data packet DP. The data packet DP contains payload data between the two control data items. The payload data includes both the data packet administration data or header data and the information data or payload that is contained in the data packet. The scheduler 2 according to the invention is able to process data packets DP of any given size and to provide or signal them to the data processing unit 6 in the form of linked data object strings for processing. The received data packets DP may, for example, be Ethernet data packets or IP data packets. The scheduler 2 stores the data packet DP that originates from a data source 1 as a data object string in the memory system 5. In such a case, the scheduler 2 uses the memory space made available by the memory system 5 optimally by linking the data objects in a data object string. The time interval $\Delta T$ between reception of the data packet and the time at which the last data object in the associated data object string is signaled to the data processing unit 6 by the scheduler 2, is signaled as the time out to the data processing unit 6 by a time out signaling unit that is contained in the scheduler 2. The time out $\Delta t$ is, in this case, very largely insensitive to changes or fluctuations in the data transmission rate R'(t) with which the data packets DP are transmitted from the data source 1 to the scheduler 2. To compensate for the variable data transmission rate R'(t), when the scheduler 2 is writing the data object string to the memory system 5, the scheduler 2 also inserts filling objects (FO) between the linked data objects (DO) into the memory system 5. The time delay At with which the scheduler 2 makes arriving data available to the data processing 6 is very accurate due to the variable size of the filling objects (FO) that are stored between the linked data objects (DO).

Figure 6:
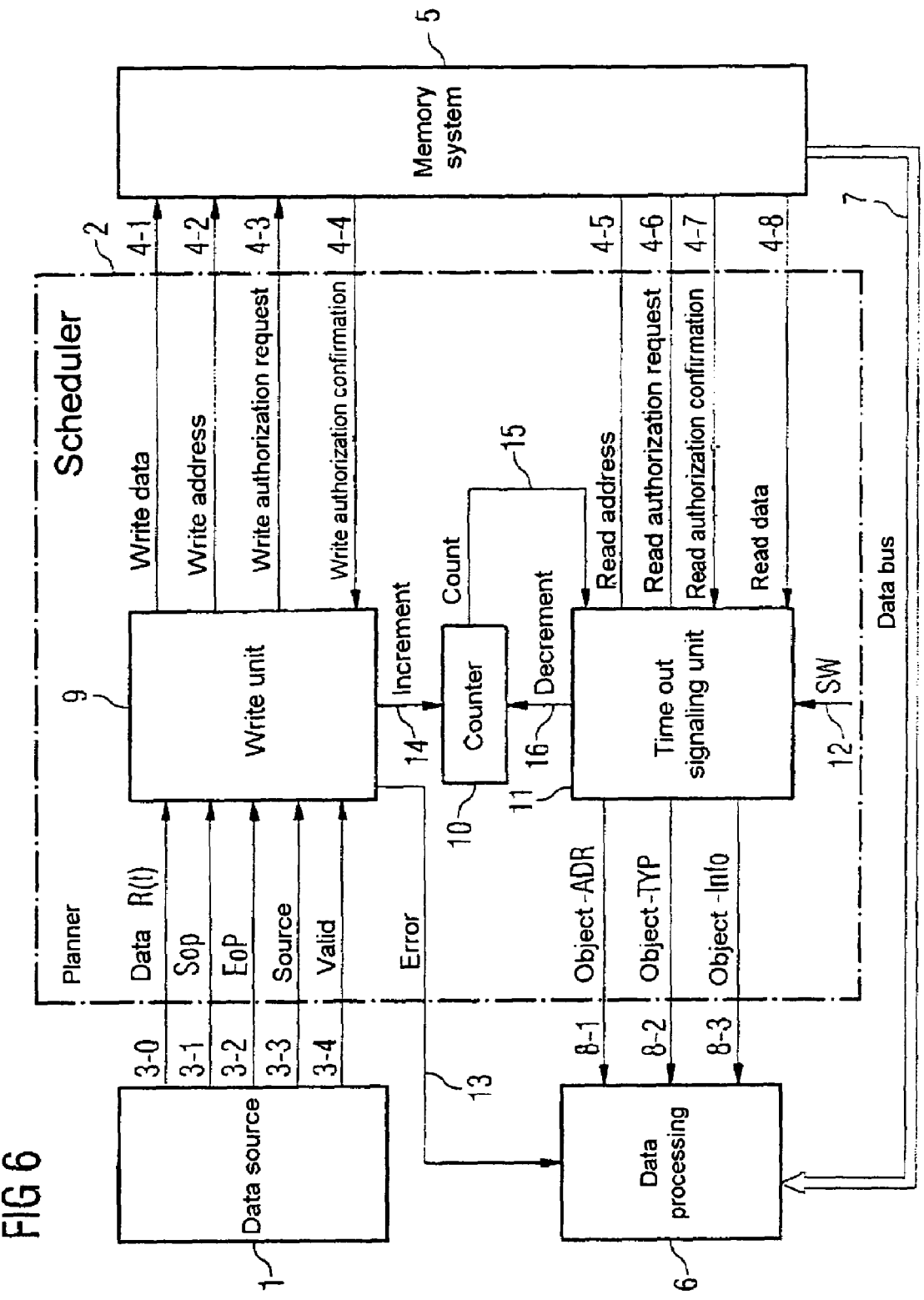
FIG. 6 is a block circuit diagram of assemblies contained in the scheduler of FIG. 5.

FIG. 6 shows the circuitry configuration of the scheduler 2 according to the invention. In one preferred embodiment, the scheduler 2 has three assemblies. The scheduler 2 contains a write unit 9, a counter 10, and a time out signaling unit 11.

The write unit 9 in the scheduler 2 is connected to a data source 1 through at least one data line 3-0. In one alternative embodiment, the write unit 9 is connected to two or more data sources 1 through a large number of data lines. In addition to the data line or the data bus 3-0, control lines 3-3 to 3-4 and, optionally, the control lines 3-1 to 3-2, are provided, by which the write unit 9 receives control signals from the data source 1. The write unit 9 receives data in packets through the data line 3-0. The control data, such as the control data SoP that identifies the start of the data packet DP, or the control data item EoP that identifies the end of the data packet DP, may either be transmitted through the data line 3-0 with the data packet (DP), depending on the transmission protocol, or through separate control lines 3-1, 3-2 as shown in FIG. 6. The write unit receives the control data item that indicates the data source through a control line 3-3. A further control line 3-4 is used to signal to the write unit 9 that the data being applied to it is valid (VALID). The data packets DP are transmitted from the data source 1, and are received by the write units 9, at a data transmission rate $$\frac{dR(t)}{dt}.$$

In such a case, the data transmission rate $$\frac{dR(t)}{dt}$$

may fluctuate severely.

The data source 1 sends, for example, a large number of data packets during one transmission process and, then, sends no data packets DP to the write unit 9 for a lengthy period. The write unit 9 receives the data packets DP and writes linked data objects to the memory system 5. The write unit 9 receives the data packets from at least data source 1 at a different data transmission rate $$\frac{dR(t)}{dt},$$

which may, additionally, be changed by the data transmission channel. For each received data packet DP, the write unit 9 calculates attribute data, and writes the payload data contained in the data packet to the memory system as a data object string including two or more linked data objects. The data object string includes pointer data for linking of the data objects, the attribute data calculated by the write units 9, and the payload data contained in the data packet DP. To compensate for the fluctuating or varying data transmission rate $$\frac{dR(t)}{dt},$$

the write unit 9 additionally inserts filling objects (FO) between the linked data objects (DO) into the memory system 5 while writing the data object string to the memory system 5.

The write unit 9 is connected to the memory system 5 through a write data line 4-1, a write address line 4-2, a write enable request line 4-3, and a write enable acknowledge line 4-4. The write unit 9 uses the write enable request line 4-3 and the write enable acknowledge line 4-4 to transfer data to the write system 6 using a handshake method. The write unit 9 emits an error signal (ERROR) to the data processing unit 6 if necessary through an indication line 13.

The counter 10 that is contained in the scheduler 2 is incremented by the write unit 9 while writing the data object string to the memory system 6, corresponding to the amount of data contained in the data packet DP and the amount of filling data in the filling objects, through a line 14.

In addition to the write unit 9, the scheduler 2 according to the invention contains a time out signaling unit 11. The time out signaling unit 11 uses indication lines 8-1, 8-2, 8-3 to signal to the data processing unit 6 that a filling object or a data object that has been buffer-stored in the memory system 5 is ready to be read by the data processing unit 6, when the counter 10 reaches a threshold value SW. For such a purpose, the time out signaling unit 11 uses a line 15 to read the count of the counter 10, and compares this with the threshold value. The threshold value SW can, in such a case, preferably, be programmed through a programming line 16. When the count reaches the threshold value SW, the time out signaling unit 11 signals to the data processing unit 6 through a line 8-1 the address of the waiting data object (DO), and signals the type of waiting data object through a further line 8-2. The data processing 6 is, optionally, supplied by the time out signaling unit 11 and through further lines 8-3 with information data about the stored data object (DO). Once the time out signaling unit 11 has signaled to the data processing unit 6 that there is a data object waiting in the memory system 6, the time out unit 11, then, decrements the counter 10 through a control line 16 as a function of the amount of data contained in the waiting data object (DO) or filling object (FO).

Figure 7:
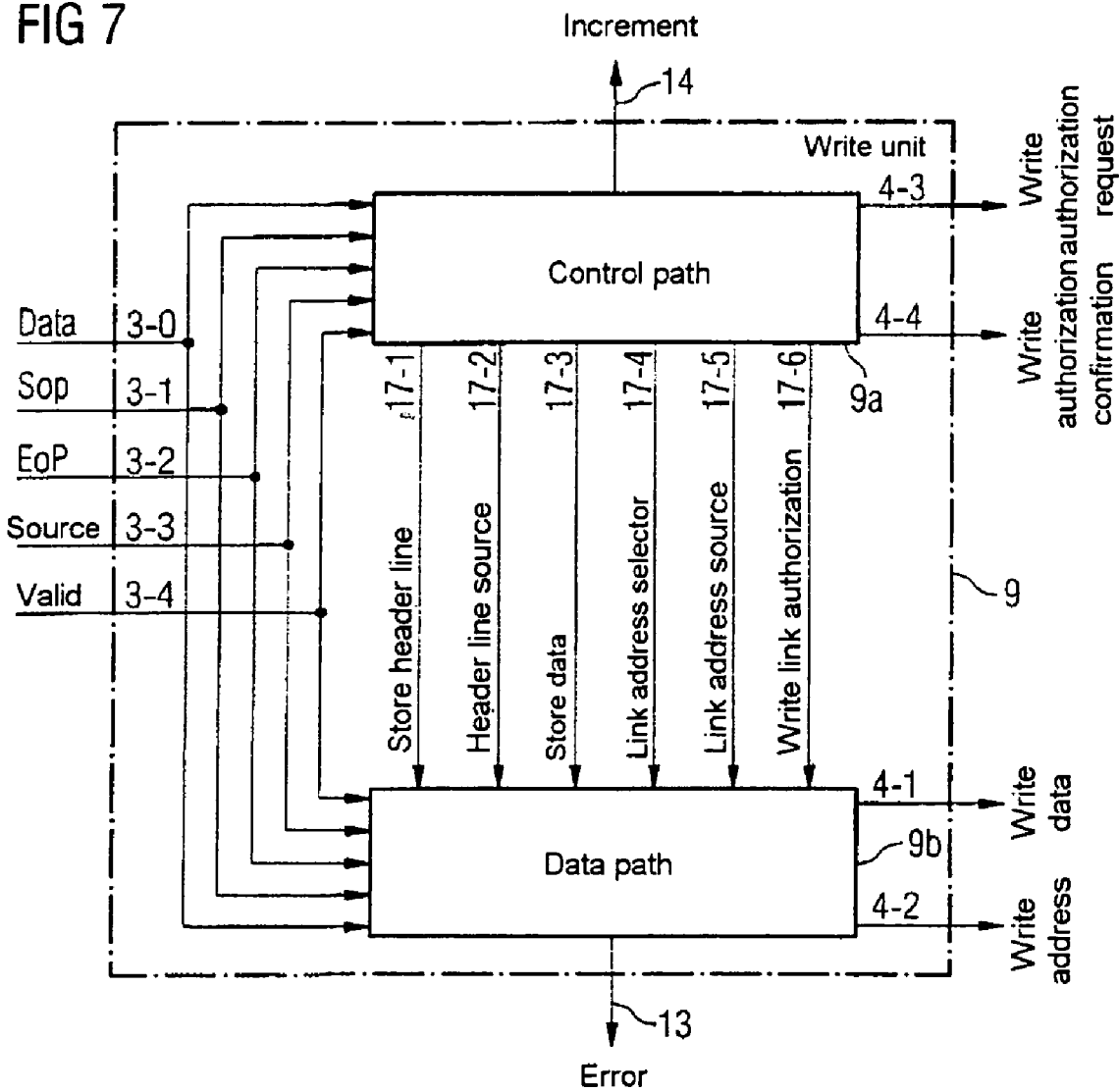
FIG. 7 is a block circuit diagram of the write unit contained in the scheduler of FIG. 5.

FIG. 7 shows the write unit 9 that is contained in the scheduler 2 according to the invention. The write unit 9 contains a control path 9a and a data path 9b. The data path 9b is controlled by the control path 9a through internal signal lines 17.

Figure 8:
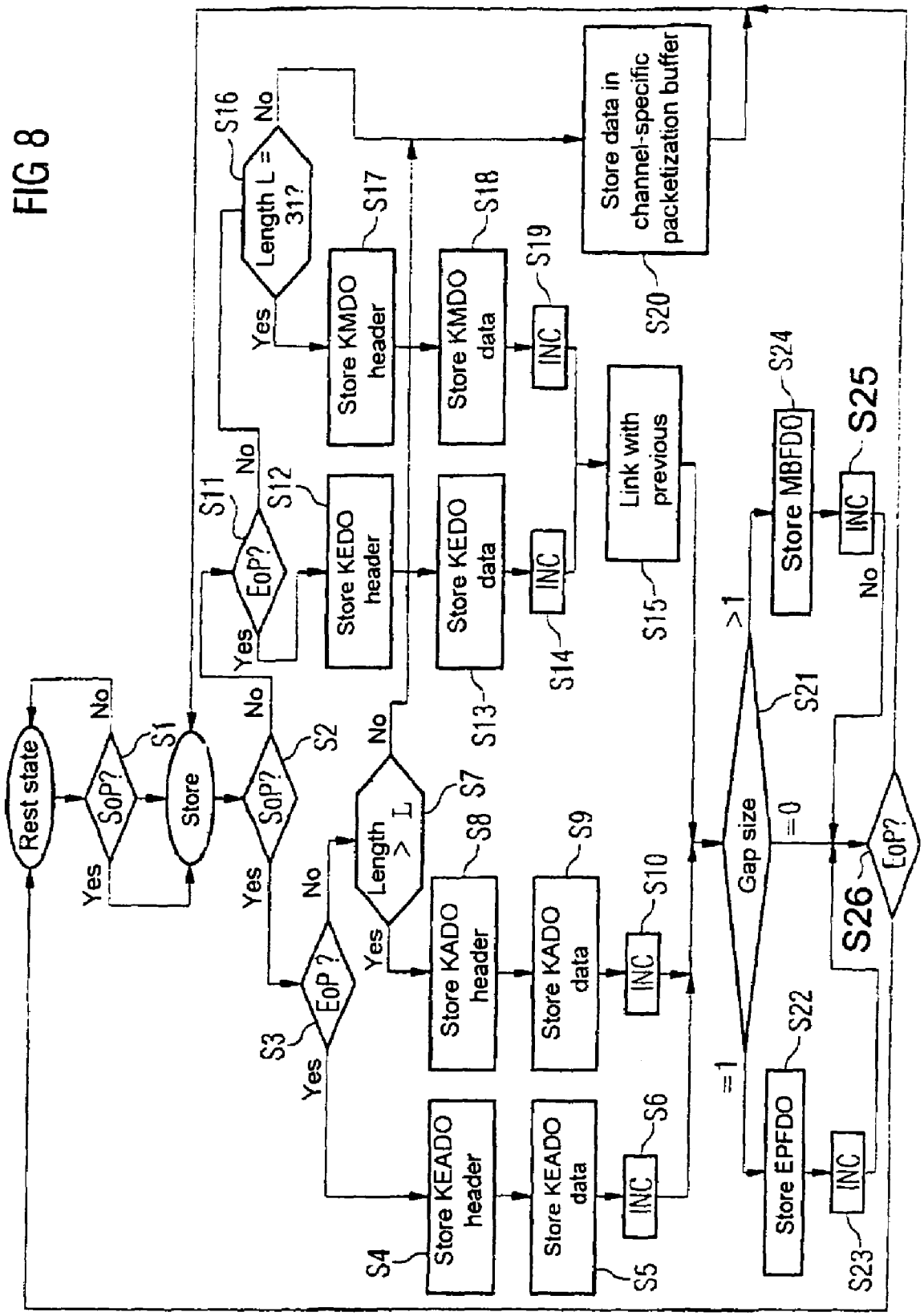
FIG. 8 is a flowchart illustrating the control process within the control path of the write unit according to the invention.

FIG. 8 shows the control program that is run within the control path 9a. First, the control path 9a is in a rest state. At the control input 3-1, it checks whether or not a control data item SoP is indicating the start of a data packet DP. If the control path finds in step S1 that a data packet DP is being received, the control path changes to a memory state. In step S2, the control path 9a checks whether or not the control data item SoP that indicates the start of a data packet DP is still present. If the control data item SoP indicates the start of a data packet, a check is carried out in step S3 to determine whether or not a control data item EoP that, at the same time, indicates the end of the data packet DP is present on the control line 3-2. In such a case, the control path 9a uses the control lines 17 to pass to the data path 9b control signals for storage of a specific data object, which is referred to as the string end and start data object (KEADO). The control signals for storage of the header data in the string end and start data object KEADO are applied to the data path 9b in step S4.

In step S5, the control path 9a emits control data for storage of the data as a string end and start data object KEADO. The counter 10 is, then, incremented through the line 14 in step S6.

If the control path 9a finds in step S3 that there is no control data item EoP on the control line 3-2, it checks whether or not the data that is present is greater than a specific length L, for example, 32 bytes. If the length check in step S7 shows that the data packet length is more than 32 bytes, the control path 9a emits control signals in step S8 to the data path 9b through the control lines 17 for storage of the header data of a second data object type, specifically, a so-called string start data object (KADO). In step S9, the control path 9a emits control signals for storage of data in the payload data field of the string start data object. The counter 10 is, then, incremented in step S10 as a function of the amount of data stored in the data object.

If the control path finds in step S2 that no control data item (SoP) that indicates the start of a data packet DP is present, a check is carried out in step S11 to determine whether or not a control data item (EoP) that denotes the end of the data packet DP is present on the control line 3-2. When the end of the data packet DP is reached, the control path 9a generates, in step S12, the control signal for the data path 9b, instructing it to store in the memory system 5 the header data of a second data object type, which is referred to as a string end data object KEDO. The control path 9a, then, generates control signals for the data path 9b for storage of the payload data in the payload data field of the string end data object, in step S13. The counter 10 is, then, incremented in step S14 through the control line 14 as a function of the amount of data that resides in the string corresponding to the string end data object in which the memory system 5 was stored.

The string end data object (KEDO) is linked to the previous data object in step S15. The previous data object (DO) is either a string start data object (KADO) or a so-called string center data object (KMDO), both of which have pointers or pointer data fields to which the start address of the string end data object (KEDO) is written.

If the control path 9a finds in step S11 that the control data EoP is not present, a check is carried out in step S16 to determine whether or not the data length of, for example, 32 bytes has been exceeded. If such is the case, the control path 9a generates, in step S17, control signals that are applied to the data path 9b through the control lines 17 and drive this to store a fourth data object type. The fourth data object type is a string center data object KMDO. In step S18, the control path 9a, then, emits to the data path 9b control signals for storage of data in the payload data field of the string center data object KMDO. The counter 10 is incremented in step S19 as a function of the amount of data stored in the string center data object KMDO.

If it is found in the checks in steps S7 and S16 that the data length of 32 bytes has not been reached, the data is buffer-stored by the write unit 9 in a channel-specific payload data buffer, in step S20.

Control data for generation of various data objects DO of a different data object type are generated in steps S1 to S19. The various data objects, specifically the string end and start data object KEADO, the string start data object KADO, the string center data object KMDO, and the string end data object KEDO, are written by the write unit 9 to the memory system 5, and a data object DO that has been written is linked in step S15 with a previous object by a pointer or pointer data. Once two data objects have been linked to one another in step S15, and/or a start data object KEADO or KADO has been generated, the data gaps between the two linked data objects are filled with filling data in the subsequent steps. For such a purpose, first of all, the size of the resultant data gap in the memory system 5 is determined in step S21. If there is no gap, or the gap size is zero, the process moves to step S26. If the gap size is precisely 1 byte, a specific filling data object, specifically a single-byte filling data object EBFDO is stored by the data path 9b between the linked data objects in step S22, corresponding to the control data generated by the control path 9a. The counter 10 is, then, incremented in step S23 as a function of the inserted amount of filling data. If it is found in the check S21 that the data gap that exists between the two linked data objects DO in the memory system 5 is more than 1 byte, the control path 9a generates, in step S24, control data for storage of a so-called multiple byte filling data object MBFDO, and emits the control signals through the control line 17 to the data path 9b. The data path 9b stores the multiple byte filling data object MBFDO in a memory system 5. The counter 10 is, then, incremented in a step S25 as a function of the stored amount of filling data.

The control path 9a, then, checks in step S26 whether a control data item EoP that indicates the end of the data packet is present on the control line 3-2. If this is the case, the control path 9a, first of all, reverts to the rest state. If the end of the data packet DP has not yet been reached, the process is continued in step S2.

FIG. 10 shows the data structure of the various data objects DO that are stored in the memory system 5 based upon the control signals on the control path 9a. The first data object type is a so-called string start data object KADO, which has a type data field for identification as a string start data object (bit coding 1 0 X), a transmission flag S, a pointer data field for linking, an attribute data field, and a payload data field for K bytes of payload data. The type data field, the transmission flag, the pointer data field, and the attribute data field form the header data HD for this data object.

The second data object is a string end data object KEDO, which has a type data field for identification as a string end data object (bit coding 0 1 0), a data field for indication of the payload data stored in it, and a payload data field. The length L of the payload data that is stored in the string end data object KEDO is variable, with L being $\leq K$.

The third data object type is a string end and start data object KEADO, which has a type data field for identification as a string end and start data object (bit coding 1 1 X), a data field for indicating the amount of payload data contained in it, a transmission flag S, an attribute data field, and a payload data field. The data size of the string end and start data object is variable as a function of the L bytes that are stored in the payload data field, with L being $\leq K$.

The fourth data object is a so-called string center data object KMDO, which has a type data field, specifically, coding 0, 0, for identification as a string center data object, a pointer data field, and a payload data field. The payload data field in the fourth string center data object KMDO has a constant size of K bytes of payload data, in the same way as the payload data field in the string start data object KADO.

The first four data objects KADO, KEDO, KEADO, and KMDO are used to store the data packet payload data in the memory system 5. The two other data objects EPFO and MBFO are used to fill the data gaps between the linked data objects DO. The fifth data object is a single-byte filling object EPFO, which includes a type data field of 1 byte for identification as a single-byte filling data object (bit coding 0 0 1). The sixth data object, which is referred to as a multiple byte filling object (bit coding 0 1 1) (MBFO) is used for filling relatively large data gaps, that is to say, data gaps of more than 1 byte. The multiple-byte filling object MBFDO includes a type data field for identification as a multiple byte filling object, and a data field that indicates the amount of filling data. The undefined files that are already stored in the memory system 5 may be used as the actual filling data so that there is no need to actually write data by write cycles. The amount of filling data indicates the largest of the data gaps to be filled.

Figure 11:
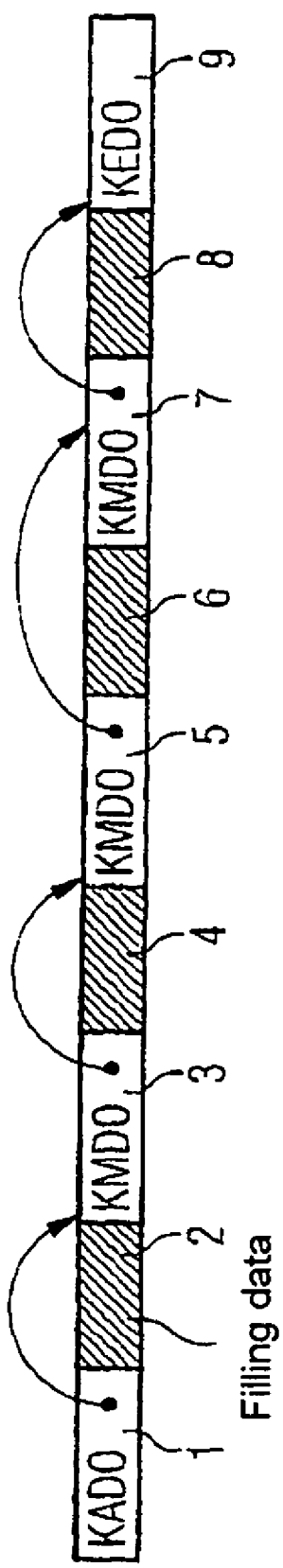
FIG. 11 is a diagrammatic illustration of a first example of a data object string, which is stored in the memory system, according to the invention.

FIG. 11 shows a first example of a data object string that is stored by the scheduler 2 according to the invention in the memory system 5. In the example illustrated in FIG. 11, the data object string includes 5 data objects, specifically, a string start data object KADO, three string center data objects KMDO, and a string end data object KEDO. The data objects are linked to one another through pointers or pointer data. The pointer data in each case indicates the start address of the next data object in the data object string. The data gaps between the linked data objects are filled by the scheduler 2 according to the invention with filling objects, that is to say, with single-byte or multiple-byte filling objects.

Figure 12:
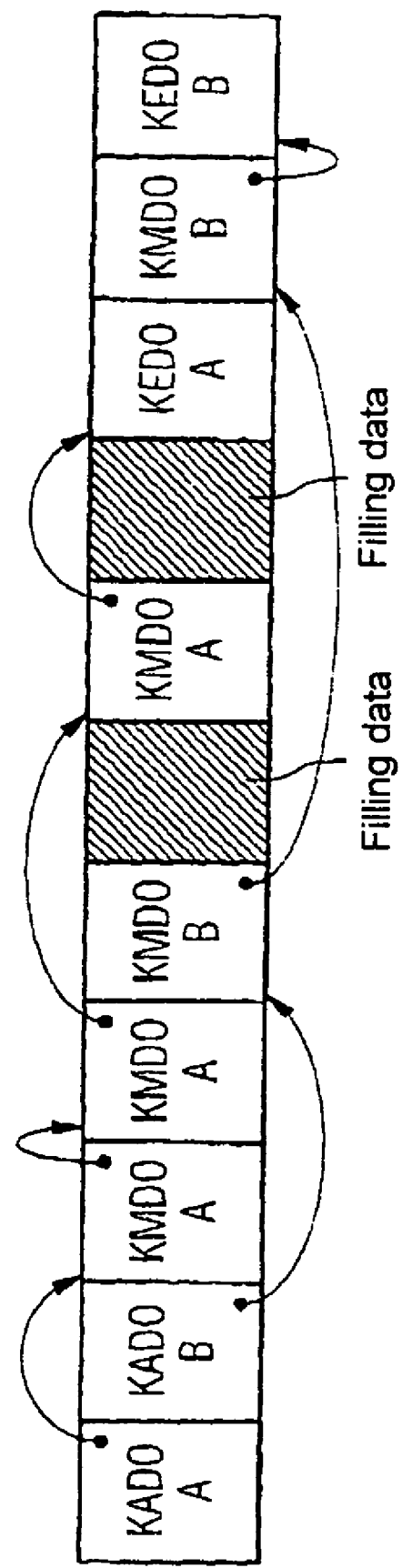
FIG. 12 according to the invention of a second example of a data object string, which is stored in the memory system, according to the invention.

FIG. 12 shows a further example for the storage of data object strings in the memory system 5. In the example illustrated in FIG. 12, two different data object strings are stored in the memory system 5, interleaved with one another. A first data object string A, likewise, includes five data objects that are linked to one another, specifically a string start data object $KADO_A$, three string center data objects $KMDO_A$, and a string end data object $KEDO_A$. The second data object string B in the illustrated example includes four data objects, specifically, a string start data object $KADO_B$, two string center data objects $KMDO_B$, and a string end data object $KEDO_B$. The two different data object strings A, B originate from two different data packets DP or data sources. As can be seen from FIG. 12, the interleaving of the data object strings makes optimum use of the memory space within the memory system 5. If the fluctuating data transmission rate R results in a gap during reception of the data DP, the gaps are filled with filling objects FO by the write unit 9.

Figure 13A:
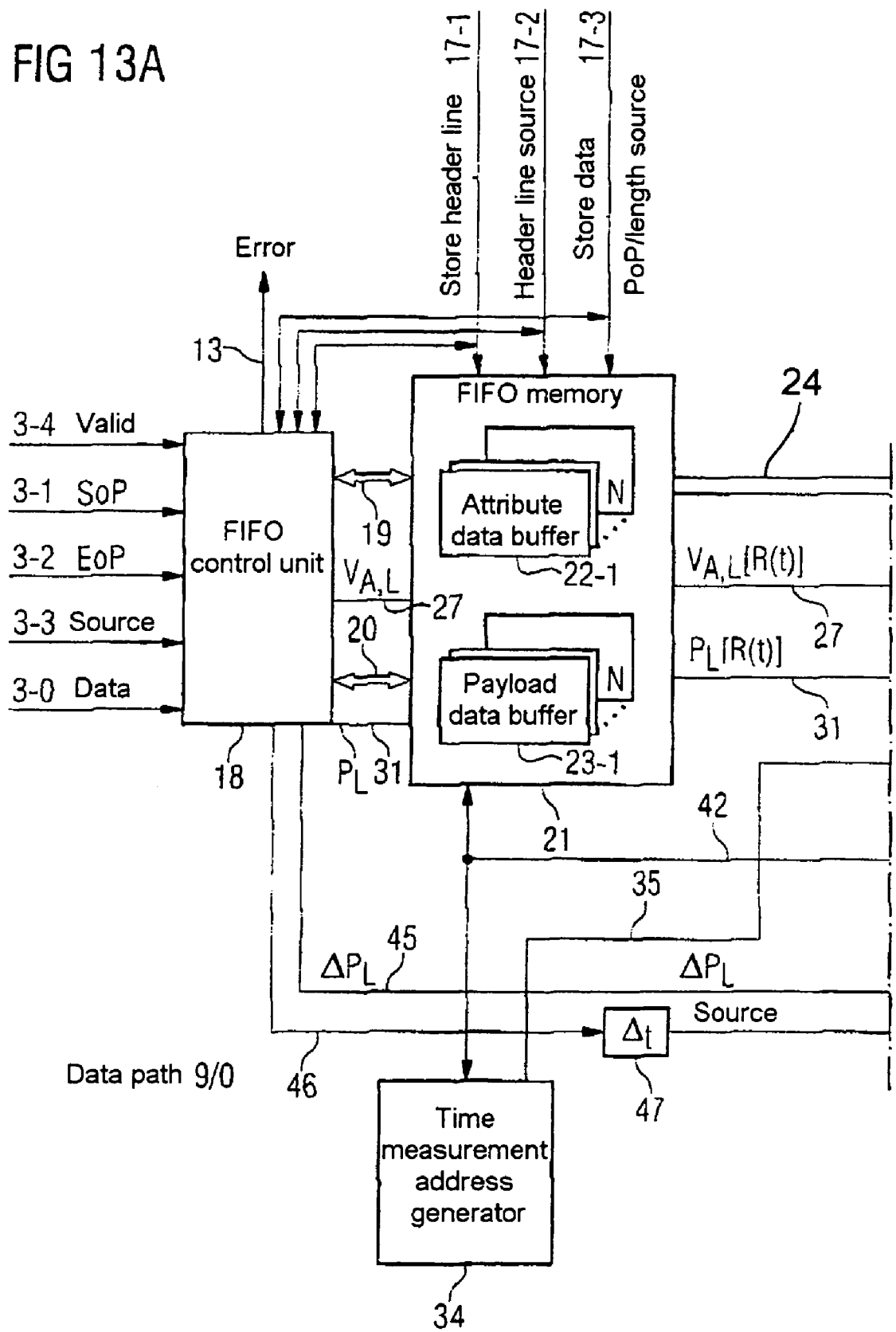
FIG. 13A is a block circuit diagram of a portion of a data path contained in the scheduler according to the invention.
Figure 13B:
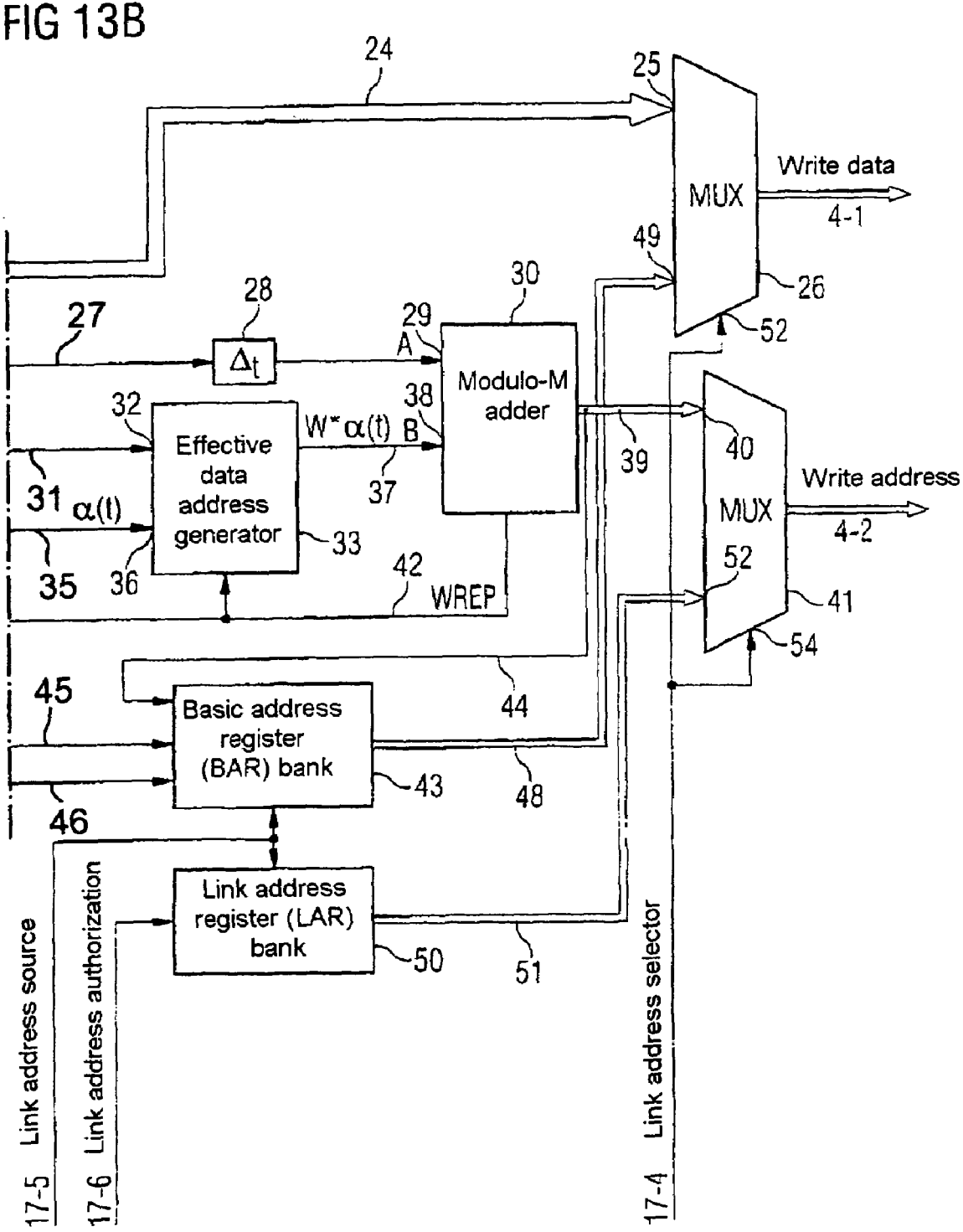
FIG. 13B is a block circuit diagram of another portion of a data path contained in the scheduler according to the invention.

FIGS. 13A and 13B show the circuitry configuration of the data path 9b illustrated in FIG. 7. The data path 9b contains a FIFO control unit 18, which is connected to a FIFO memory 21 through lines 19, 20. The FIFO control unit 8 receives data in packets through a data line 3-0 from at least one data source 1. A control data item SoP, which identifies the start of the data packet DP, and a control data item EoP, which identifies the end of the data packet, is monitored for by the FIFO control unit 18, for each received data packet. The control path calculates so-called attribute data as a function of system settings and/or administration data for the received data packet DP. The attribute data includes the header or administration data in the received data packet DP as well as further information, for example, relating to the data source, packet descriptors, and the like. The control path stores the calculated attribute data in an attribute data buffer 22-*i*. The payload data that is received in the received data packet bus DP is stored by the FIFO control unit 18 in a payload data buffer 23-*i* in the FIFO memory 21. In one preferred embodiment, the FIFO memory 21 has an attribute data buffer 22-*i* and a payload data buffer 23-*i* for each data source. If the control unit 18 finds that a data packet DP has originated from a specific data source 1-*i*, the calculated attribute data is written to the associated attribute data buffer 22-*i*, and the payload data is written to the associated payload data buffer 23-*i*. The FIFO control unit 18 produces an error signal (ERROR) when a payload data buffer 23-*i* that is associated with the data source 1 is full, and further data packets or data are or is received from this data source. The error signal (ERROR) is admitted through a control line 13. The FIFO control unit 18 receives control signals from the control path 9a through control signal lines 17-1, 17-2, 17-3. The FIFO control unit 18 receives through a control line 17-1 the control signals that are generated in steps S4, S8, S12, S17 to write the header data HD of the four different data objects KEADO, KADO, KEDO, KMDO. The FIFO control unit 18 receives the header source through a control line 17-2. Finally, the FIFO control unit 18 receives by a control line 17-3 a store data control signal for selection of attribute, content, or payload data. The FIFO memory 21 is connected through data lines 24 to a first input 25 of a data multiplexer 26. To generate data objects DO, the attribute data buffer 22 and the payload data buffer 23 in the FIFO memory 1 are read through the data lines 24 to the memory system 5 in accordance with the control commands. The FIFO control unit 18 calculates the cumulative amount of attribute data $V_{A,C}$ in the attribute data (which have been written to the memory system 5) for a data packet DP. The cumulative amount of attribute data $V_{A,L}$ is, in this case, determined as set forth in the following text.

During the packetization process, the cumulative data packet length $L_n$ is defined as follows:

$$\begin{cases} L_0 = 0 \\ L_n \geq L_{n-1}, \forall n > 0 \end{cases}$$

where:

$$\sup_{n \geq 0} \{L_{n+1} - L_n\} \in \mathcal{R}$$

The value $L_n - L_{n-1}$ is interpreted as the length of the n-th data packet.

The cumulative data packet length $P_L$ is obtained as a function of the cumulative packet length $L_n$ as follows:

$$P_L(x) = \sup_{\substack{n \geq 0 \\ L_n \leq x}} \{L_n\}$$

The function $P_L$ is regarded as the local transfer function.

During the packetization process, a data stream with a cumulative distribution R(t) is received, and a data stream with a cumulative distribution $P_L(R(t))$ is produced.

To take account of the calculated attribute data, such as data object pointers or time stamps, a further cumulative attribute length $A_n$ is determined, which is analogous to the packet length and takes account of the attribute data. The amount of data $A_n - A_{n-1}$ forms the amount of data for attribute data for the n-th packet.

The cumulative amount of attribute data $V_{A,L}$ is obtained from the cumulative packet lengths $A_n$ and $L_n$ using the following equation:

$$V_{A,L}(x) = \sup_{\substack{n \geq 0 \\ L_n \leq x}} \{A_n\}$$

The function $V_{A,L}$ in such a case forms the ideal transfer function.

The calculation unit for calculation of the attribute data produces two cumulative data packet lengths $A_n$ and $L_n$, and a characteristic value $V_{A,L}$. The cumulative value for the amount of attribute data $V_{A,L}$ calculated in accordance with the above equation is supplied from the control unit 18 through a line 27 and a delay circuit 28 (which is used for time synchronization) to a first input 29 of a modulo-M adder 30. The calculated cumulative amount of payload data $P_L$ is supplied from the control unit 18 through a line 31 to a first input 32 of an effective data address generator (EDAC) 33. The effective data address generator 33 calculates a time wheel or timing wheel distribution. The time wheel distribution represents the cumulative distribution of the emitted data flow. The time wheel distribution ($W^*_\alpha(t)$) is calculated as a function of the cumulative amount of data ($P_L$) as calculated by the control unit 18, and the data arrival curve α that is emitted from a counting device 34. For such a purpose, the data path 9a has an incrementing or counting device 34, which supplies a rising count through a line 35 to a second input 36 of the effective data address generator 33 in accordance with an ideal nominal data arrival curve. The time wheel distribution is calculated using the following equation:

$$W^{*\prime}_\alpha(t) = \begin{cases} R'(t) & \text{if } W^*_\alpha(t) > \alpha(t) \\ \max[R'(t)\alpha'(t)] & \text{if } W^*_\alpha(t) = \alpha(t) \\ \alpha'(t) & \text{if } W^*_\alpha(t) < \alpha(t) \end{cases}$$

$W^*_\alpha(0) = 0$, where, at all times, $\bar{t}$, so that:

$$\lim_{t \to \bar{t}^+} X(t) = \lim_{t \to \bar{t}^-} X(t) + h, \; h > 0$$

where the definition of the operator "max" is expanded as follows:

$$X'(\bar{t}) = h\delta_{\bar{t}} + X'^+(\bar{t}), \; X'^+(\bar{t}) = \lim_{\Delta \to 0^+} \frac{X(\bar{t} + \Delta) - X(\bar{t})}{\Delta}$$

$$\max[a\delta_{\bar{t}} + A(t), B(t)] \doteq \begin{cases} \max[A(t), B(t)] & t \neq \bar{t} \\ a\delta_{\bar{t}} + A(\bar{t})' & t = \bar{t} \end{cases}$$

$$\max[a\delta_{\bar{t}} + A(t), b(\delta_{\bar{t}}) + B(t)] \doteq \begin{cases} \max[A(t), B(t)] & t \neq \bar{t} \\ \max(a, b)\delta_{\bar{t}} + \max A(\bar{t}), B(\bar{t}) & t = \bar{t} \end{cases}$$

The function $W^*_\alpha(t)$ is the cumulative distribution of the emitted data stream for an ideal case, in which an arriving data stream with a cumulative data distribution R(t) for a predetermined arrival curve is received at α(t), where R(t) is the amount of data in the received data packet, and α is the linear nominal data arrival curve.

The time wheel distribution ($W^*_\alpha(t)$) forms the cumulative distribution of the outgoing data stream for an ideal apparatus that receives an arriving data stream with a cumulative distribution R(t) for identification of the data arrival curve a. The time wheel in this case represents an ideal case, which produces an outgoing data stream ($W^*_\alpha(t)$) for a predetermined data arrival curve a and a cumulative data distribution of the received data stream R(t). The time wheel distribution ($W^*_\alpha$ (t)) that is produced by the effective address generator 33 is applied through a line 37 to a second input 38 of the module-M adder 30. The modulo-M adder 30 adds the cumulative amount of attribute data $V_{A,L}$ to the calculated time wheel distribution ($W^*_\alpha(t)$), which produces a data object address that is applied through lines 39 to a first input 40 of an address multiplexer 41. In the modulo-M addition, M represents the memory capacity of the memory system 5. If the sum of the two values that are applied to the inputs 29, 38 is greater than M, the modulo-M adder produces an overflow indication signal WREP, and emits this through a control line 42.

The overflow indication leads to the FIFO control unit 18, the counting device 34, and the effective address generator 33 reducing their respective data output values ($V_{A,L}$, $P_L$, α, $W^*_2$) by M.

The data path 9a in the write control unit 9 has a basic address register bank 43 that includes two or more basic address registers BAR. In such a case, one basic address register BAR is, preferably, provided for each data source 1. The basic address register bank 43 receives the output signal from the modulo-M adder 30 through a data line 44.

Furthermore, the basic address register bank 43 is supplied through a line 45 with a control signal from the FIFO control unit 18 when the value of the calculated cumulative amount of payload data PL changes. This signal is used as a write enable WE for the basic address register bank, and indicates that the FIFO control unit 18 has stored a new data object in the memory system 5. The basic address register bank 43 receives the source or write address from the FIFO control unit 18 through a line 46 and a delay circuit 47 for time synchronization. Whenever a data object DO is generated, the basic address register of the associated data source 1 is set to the initial address of the data object DO. The basic address that is buffer-stored in the basic address register BAR is applied through lines 48 to a second input 49 of the data multiplexer 26.

In addition to the basic address register bank 43, the data path 9 contains a link address register bank 50, which is provided for linking of the data objects DO that have been written. One link address register LAR is, preferably, provided within the link address register bank 50 for each data source 1. The address of the data object DO that was most recently written to the memory system 5 is buffer-stored in the link address register for linking to the next data object DO in the data object string DOK. The buffer-stored address is applied through data lines 51 to a second input 52 of the address multiplexer 41. The link address register bank 50 receives an enable signal from the control path 9a through a control line 17-6. A link address source is supplied through a control line 17-5 to the basic address register bank 43 and to the link address register bank 50. The data multiplexer 26 has a control input 52 for reception of a link address selector signal through a control line 17-4. The address multiplexer 41, likewise, has a control input 54 for reception of the link address selector control signal.

The data path 9a and the write unit 9 can be switched between two operating modes as a function of the control signal, with the data objects (DO) being written to the memory system 5 in the first operating mode, and the data objects (DO) that have been written being linked to one another in the second operating mode. In the first operating mode, the payload and attribute data that is applied to the first input 25 of the data multiplexer 26 and the address that has been calculated by the modulo-M adder 30 through the first data input 40 of the address multiplexer 41 are passed on and written. Once a data object $DO_n$ has been written, it is linked to the previous data object $D_{n-1}$ by both multiplexers 26, 41 being switched to the second input 49 or 52, respectively, by the link address selector control signal. After switching, the data item that is stored in the basic address register BAR is written to the address stored in the link address register LAR to link the two data objects $DO_n$, $DO_{n-1}$.

Figure 14:
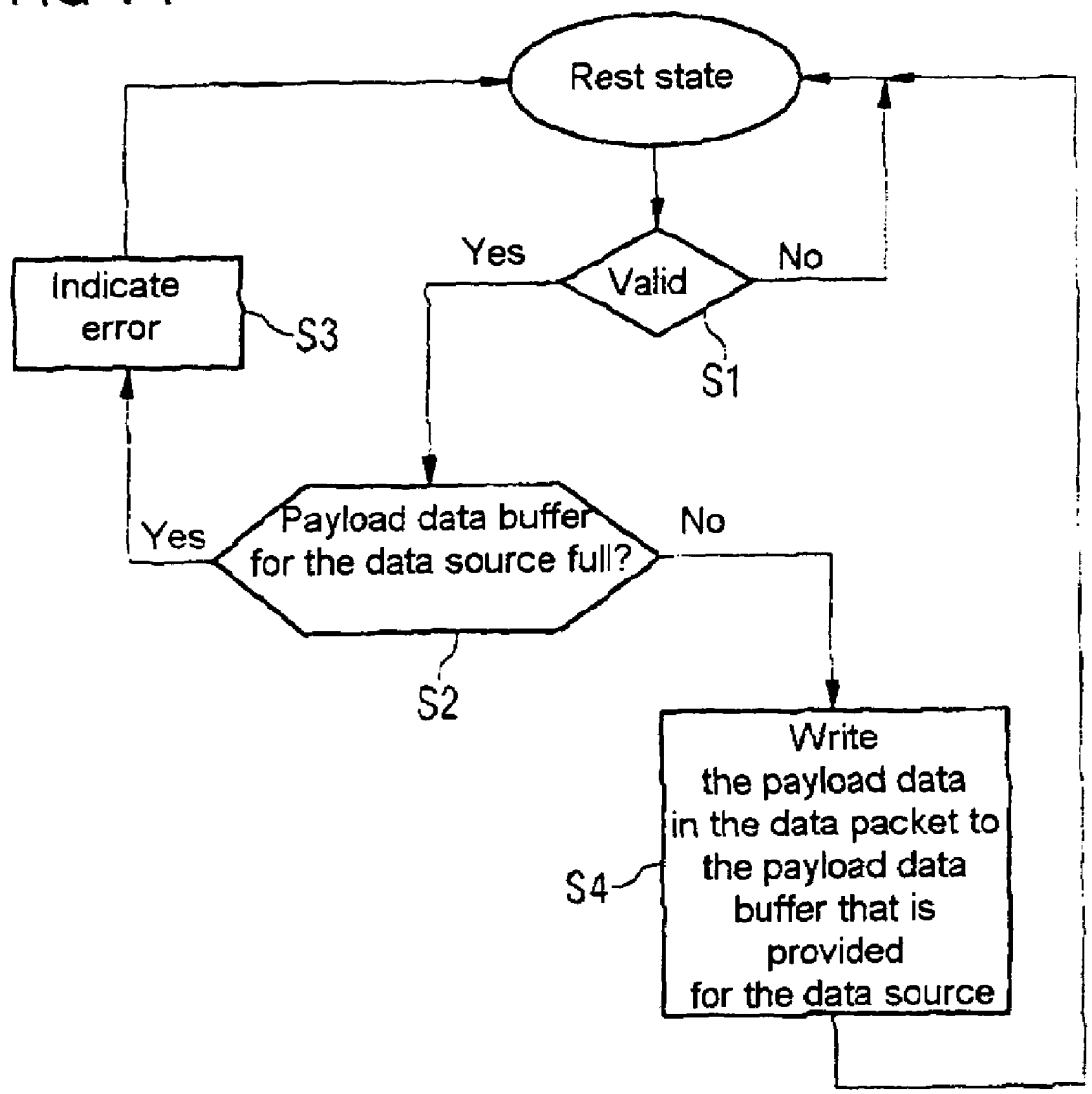
FIG. 14 is a flowchart of the FIFO control unit according to the invention for writing payload data to a payload data buffer.

FIG. 14 is a flowchart for writing the payload data to the payload data buffer 23-i in the FIFO memory 21. The FIFO control unit 18 is initially in a rest state. As soon as the FIFO control unit 18 receives a valid or VALID signal in step S1 through the control line 3-4, the control unit 18 checks, in step S2, whether or not the payload data buffer 23-i associated with the data source 1 is already full. If this is the case, the FIFO control unit 18 emits an error signal through the indication line 13 in step S3. If the payload data buffer 23-i is not yet full, the payload data in the received data packet DP is written in step S4 to a payload data buffer 23-i that is provided for the data source 1-x. The FIFO control unit 18, then, reverts to the rest state.

FIG. 15 shows the reading of data from the FIFO memory 21 by the FIFO control unit 18 for storage in the memory system 5 through the data multiplexer 26. The FIFO control unit 18 is initially in a rest state. When the FIFO control unit 18 receives a POP control signal from the control path 9a through a control line 17-3, the control unit 18 checks, in step S2, whether or not there is any attribute or payload data to be read. If the data to be read is attribute data, attribute data is read in step S3 from the attribute data buffer 22-i based upon the data length L as stated through the control line 17-3. The control unit 18, then, increments the cumulative amount of attribute data $V_{A,L}$ in step S4. The incremented value is buffer-stored, for example, in a register within the control unit 18. If the check in step S2 finds that the data to be read is payload data, the payload data is read in step S5 from the payload data buffer 23-i associated with that data source based upon the stated data length L. The cumulative amount of payload data PL is, then, incremented by the FIFO control unit 18, and is, preferably, stored in a register, in step S6.

FIG. 16 shows the procedure that takes place in the time out signaling unit 11 in the scheduler 2. First of all, the time out signaling unit 11 is in a rest state. The time out signaling unit 11 uses a line 15 to check the count of the counter 10 in step S1, and compares this with a, preferably, programmable threshold value SW in step S1. If the count exceeds the threshold value S, the data object header (HD) is read, in step S2, from the memory system 6 through a line 4-8 for the initial address of the last data object in the data object string. The data object size of the data object is determined in step S3. The amount of data in the payload data contained in the data object is determined in step S4. The "Last Address" is incremented by the amount of data "Object Data Size" in step S5. The counter 10 is, then, decremented in step S6, as a function of the amount of payload data contained in the last data object DO.

This application claims the priority, under 35 U.S.C. § 119, of German patent application No. 103 17 370.6, filed Apr. 15, 2003; the entire disclosure of the prior application is herewith incorporated by reference.

I claim:

1. A scheduler for a memory system for buffer storage of data processed by at least one data processing unit, comprising:
   a write unit for writing data objects to the memory system, said write unit:
   receiving data packets from at least one data source at a variable data transmission rate, the data packets having payload data;
   calculating attribute data for each received data packet;
   writing the data contained in the data packet to the memory system as a data object string including data objects linked to one another, the data object string including pointer data for linking the data objects, the attribute data calculated, and the payload data; and
   inserting filling objects into the memory system between the data objects linked to one another to compensate for the variable data transmission rate when writing the data object string to the memory system;
   a counter connected to said write unit and incremented by said write unit when the data object string is written to the memory system to correspond to an amount of data contained in the data packet and the filling data in the filling objects;
   a time out signaling unit connected to said counter, said time out signaling unit:
   signaling, when said counter reaches a threshold value, to the data processing unit that at least one of the data object and the filling object buffer stored in the memory system is ready to be read; and
   subsequently decrementing said counter corresponding to the data contained in the data object provided;
   said write unit having a control path and a data path;
   said data path having a counting device incremented linearly in accordance with a linear nominal data arrival curve; and
   said data path having an effective data address generator calculating a time wheel distribution as a function of a calculated cumulative amount of data and of a count produced by the counting device, as follows:

$$W_\alpha^*(t) = \begin{cases} R'(t) & \text{if } W_\alpha^*(t) > \alpha(t) \\ \max[R'(t), \alpha'(t)] & \text{if } W_\alpha^*(t) = \alpha(t) \\ \alpha'(t) & \text{if } W_\alpha^*(t) < \alpha(t) \end{cases},$$

where R(t) is an amount of data in a received data packet, and α is the linear nominal data arrival curve.

2. The scheduler according to claim 1, wherein the data object string includes linked data objects having different data object types.

3. The scheduler according to claim 2, wherein a first of said data object types is a string start data object having:
   a type data field for identification as the string start data object;
   a transmission flag;
   a pointer data field for linking;
   an attribute data field; and
   a payload data field.

4. The scheduler according to claim 2, wherein a second of said data object types is a string end data object having:
   a type data field for identification as the string end data object;
   a data field for inputting an amount of the payload data; and
   a payload data field.

5. The scheduler according to claim 2, wherein a third of said data object types is a string end and start data object having:
   a type data field for identification as the string end and start data object;
   a data field for outputting the amount of payload data;
   a transmission flag;
   an attribute data field; and
   a payload data field.

6. The scheduler according to claim 2, wherein a fourth of said data object types is a string center data object having:
   a type data field for identification as the string center data object;
   a pointer data field; and
   a payload data field.

7. The scheduler according to claim 2, wherein a fifth of said data object types is a single-byte filling object having a type data field including one byte for identification as a single-byte filling object.

8. The scheduler according to claim 2, wherein a sixth of said data object types is a multiple-byte filling object having a type data field for identification as a multiple byte filling object and a data field indicating an amount of filling data.

9. The scheduler according to claim 1, wherein said data path has:
   a FIFO memory; and
   a FIFO control unit connected to said FIFO memory for writing and reading data to and from said FIFO memory.

10. The scheduler according to claim 9, wherein said FIFO control unit receives data from the at least one data source in the form of packets as data packets.

11. The scheduler according to claim 10, wherein each received data packet has:
    a control data item identifying a start of the data packet; and
    a control data item identifying an end of the data packet.

12. The scheduler according to claim 11, wherein the payload data in the received data packets respectively include administration data and information data.

13. The scheduler according to claim 9, wherein said FIFO control unit calculates attribute data for each received data packet.

14. The scheduler according to claim 13, wherein:
    the payload data in the received data packets respectively include administration data; and
    said control path calculates the attribute data as a function of system settings of said write unit and of the administration data in the data packets.

15. The scheduler according to claim 13, wherein:
    said FIFO memory has an attribute data buffer; and
    said FIFO control unit buffer-stores the calculated attribute data in said attribute data buffer.

16. The scheduler according to claim 9, wherein:
    said FIFO memory has a payload data buffer; and
    said FIFO control unit butter-stores the payload data in a data packet with said payload data buffer.

17. The scheduler according to claim 9, wherein said FIFO memory has an attribute data buffer and a payload data buffer for each data source.

18. The scheduler according to claim 9, wherein:
    the data source is a plurality of data sources; and
    said FIFO memory has an attribute data buffer and a payload data buffer for each of the data sources.

19. The scheduler according to claim 17, wherein said FIFO control unit produces an error signal when said payload data buffer associated with one data source is full and receives no further data.

20. The scheduler according to claim 9, wherein:
    said control path transmits control signals to said FIFO control unit; and
    said FIFO control unit writes the attribute data and the payload data of a data packet to the memory system in the form of a data object string including data objects linked to one another as a function of the control signals said FIFO control unit receives from said control path.

21. The scheduler according to claim 9, wherein said FIFO control unit records a cumulative amount of attribute data of the attribute data in a data packet.

22. The scheduler according to claim 9, wherein said FIFO control unit records the cumulative amount of payload data of the payload data in a data packet.

23. The scheduler according to claim 1, wherein:
    said data path has a modulo-M adder; and
    said modulo-M adder adds a cumulative amount of attribute data to the calculated time wheel distribution to produce a data object address modulo-M, where M is a memory capacity of the memory system.

24. The scheduler according to claim 1, wherein:
    said data path has a basic address register bank including at least two basic address registers; and
    one of said basic address registers is provided for each data source.

25. The scheduler according to claim 1, wherein:
    the data source is a plurality of data sources;
    said data path has a basic address register bank including at least two basic address registers; and
    one of said basic address registers is provided for each of said data sources.

26. A scheduler for a memory system for buffer storage of data processed by at least one data processing unit, comprising:
    a write unit for writing data objects to the memory system, said write unit:
        receiving data packets from at least one data source at a variable data transmission rate, the data packets having payload data;
        calculating attribute data for each received data packet;
        writing the data contained in the data packet to the memory system as a data object string including data objects linked to one another, the data object string including pointer data for linking the data objects, the attribute data calculated, and the payload data; and
        inserting filling objects into the memory system between the data objects linked to one another to compensate for the variable data transmission rate when writing the data object string to the memory system;
    a counter connected to said write unit and incremented by said write unit when the data object string is written to the memory system to correspond to an amount of data contained in the data packet and the filling data in the tilling objects;
    a time out signaling unit connected to said counter, said time out signaling unit:
        signaling, when said counter reaches a threshold value, to the data processing unit that at least one of the data object and the filling object buffer-stored in the memory system is ready to be read; and
        subsequently decrementing said counter corresponding to the data contained in the data object provided;
    said write unit having a control path and a data path;
    said data path having a basic address register bank including at least two basic address registers; and
    one of said basic address registers being provided for each data source; and
    said data path having:
        a FIFO memory; and
        a FIFO control unit connected to said FIFO memory for writing and reading data to and from said FIFO memory;
        said FIFO control unit records the cumulative amount of payload data of the payload data in a data packet; and
    an initial address of the data object is written to said basic address register whenever there is a change to the calculated cumulative amount of payload data.

27. The scheduler according to claim 1, wherein:
    said data path has a link address register bank including at least two link address registers; and
    one of said link address registers is provided for each data source.

28. The scheduler according to claim 1, wherein:
    the data source is a plurality of data sources;
    said data path has a link address register bank including at least two link address registers; and one of said link address registers is provided for each of said data sources.

29. The scheduler according to claim 27, wherein said link address register buffer-stores an address of the data object written most recently to the memory system for linking to a next data object in the data object string.

30. The scheduler according to claim 9, wherein said data path has a data multiplexer for writing data to the memory system and an address multiplexer for supplying an address to the memory system.

31. A scheduler for a memory system for buffer storage of data processed by at least one data processing unit, comprising:
  a write unit for writing data objects to the memory system, said write unit:
    receiving data packets from at least one data source at a variable data transmission rate, the data packets having payload data;
    calculating attribute data for each received data packet;
    writing the data contained in the data packet to the memory system as a data object string including data objects linked to one another, the data object string including pointer data for linking the data objects, the attribute data calculated, and the payload data; and
    inserting filling objects into the memory system between the data objects linked to one another to compensate for the variable data transmission rate when writing the data object string to the memory system;
  a counter connected to said write unit and incremented by said write unit when the data object string is written to the memory system to correspond to an amount of data contained in the data packet and the filling data in the filling objects;
  a time out signaling unit connected to said counter, said time out signaling unit:
    signaling, when said counter reaches a threshold value, to the data processing unit that at least one of the data object and the filling object buffer-stored in the memory system is ready to be read; and
    subsequently decrementing said counter corresponding to the data contained in: the data object provided;
  said write unit having a control path and a data path;
  said data path having:
    a FIFO memory; and
    a FIFO control unit connected to said FIFO memory for writing and reading data to and from said FIFO memory;
  said data path having a data multiplexer for writing data to the memory system and an address multiplexer for supplying an address to the memory system;
  said data path having a basic address register bank including at least two basic address registers;
  one of said basic address registers is provided for each data source; and
  said data multiplexer having:
    a first input connected to said FIFO memory, said first input receiving the attribute and payload data read from said FIFO memory; and
    a second input connected to said base address register bank, said second input receiving the linking data.

32. The scheduler according to claim 31, wherein:
said data path has a data multiplexer for writing data to the memory system and an address multiplexer for supplying an address to the memory system;
said data path has a link address register bank including at least two link address registers;
one of said link address registers is provided for each data source;
said modulo-M adder has an output; and
said address multiplexer has:
  a first input connected to said output of said modulo-M adder, said first input receiving a data address from said output; and
  a second input connected to said link address register bank, said second input receiving a string address from said link address register bank.

33. The scheduler according to claim 23, wherein:
said data path has a data multiplexer for writing data to the memory system and an address multiplexer for supplying an address to the memory system;
said data path has:
  a FIFO memory; and
  a FIFO control unit connected to said FIFO memory for writing and reading data to and from said FIFO memory;
said data path has a link address register bank including at least two link address registers;
one of said link address registers is provided for each data source;
said modulo-M adder has an output; and
said address multiplexer has:
  a first input connected to said output of said modulo-M adder, said first input receiving a data address from said output; and
  a second input connected to said link address register bank, said second input receiving a string address from said link address register bank.

34. The scheduler according to claim 32, wherein:
said control path generates a control signal;
said data path is switched between first and second operating modes as a function of said control signal;
said first input of said data multiplexer and said first input of said address multiplexer are each connected to the memory system in said first operating mode to write data objects to the memory system; and
said second input of said data multiplexer and said second input of said address multiplexer are each connected to the memory system in said second operating mode to link a most recently written data object.

* * * * *